United States Patent
Uehara et al.

(10) Patent No.: US 7,334,328 B2
(45) Date of Patent: Feb. 26, 2008

(54) METHOD OF MANUFACTURING AXIS SEALS HAVING REDUCED GAS LEAKAGE PROPERTIES AND A ROTARY MACHINE USING AXIS SEALS

(75) Inventors: Hidekazu Uehara, Takasago (JP); Tanehiro Sinohara, Takasago (JP); Takasi Nakano, Takasago (JP); Sin Nisimoto, Takasago (JP); Takayuki Kurimura, Takasago (JP); Yuichi Hirakawa, Takasago (JP); Tatsuji Takahasi, Takasago (JP); Sin Koga, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 544 days.

(21) Appl. No.: 10/868,870

(22) Filed: Jun. 17, 2004

(65) Prior Publication Data

US 2005/0125983 A1 Jun. 16, 2005

(30) Foreign Application Priority Data

Jun. 20, 2003 (JP) ............................. 2003-176052

(51) Int. Cl.
*B21D 53/84* (2006.01)

(52) U.S. Cl. ..................... 29/888.3; 277/313; 277/357; 277/312

(58) Field of Classification Search ............... 29/888.3; 277/312, 313, 357

See application file for complete search history.

(56) References Cited

U.S. PATENT DOCUMENTS

| 5,135,237 A | 8/1992 | Flower |
| 6,267,381 B1 | 7/2001 | Wright |
| 7,032,304 B2 * | 4/2006 | Gieskes ....................... 29/832 |

FOREIGN PATENT DOCUMENTS

| EP | 0 933 567 | 8/1999 |
| EP | 1 302 708 | 4/2003 |
| JP | 7-176669 | 7/1995 |
| WO | 00/03164 | 1/2000 |

* cited by examiner

*Primary Examiner*—Rick K Chang
(74) *Attorney, Agent, or Firm*—Wenderoth, Lind & Ponack, L.L.P.

(57) ABSTRACT

In a method of manufacturing an axis seal, first, a roll of rolled metal material is cut into metal material plates of a predetermined size. Next, metal material plates are etched from both sides so as to form a predetermined size. Subsequently, the thin metal plates are arranged so as to be in a ring shape, oriented in the same direction, and are welded so as to be fixed. Additionally, during these processes, heat treatment is performed by heating rolls of rolled metal materials or metal material plates or thin metal plates at a predetermined timing, thereby eliminating residual stress (strain).

13 Claims, 19 Drawing Sheets

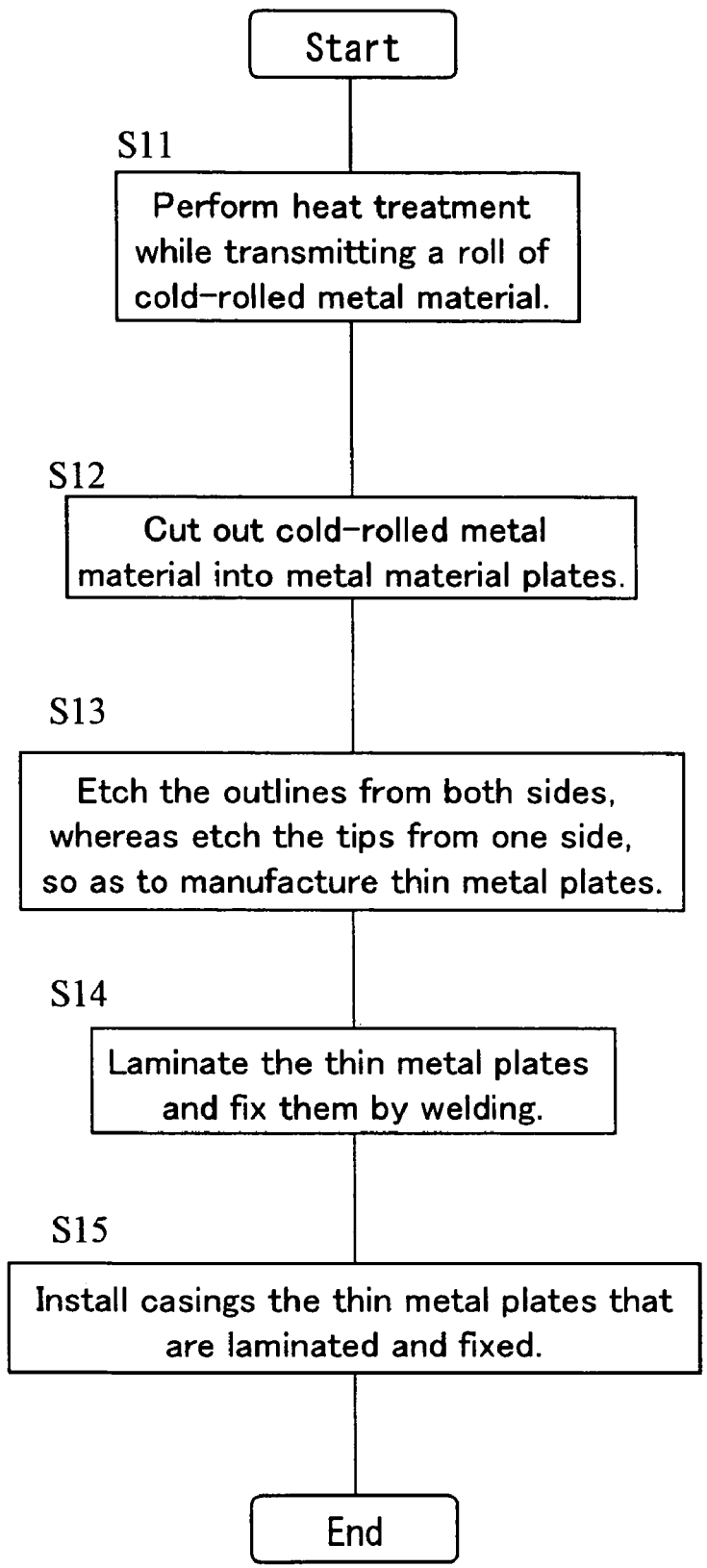

METHOD OF MANUFACTURING AXIS SEALS HAVING REDUCED GAS LEAKAGE PROPERTIES AND A ROTARY MACHINE USING AXIS SEALS

BACKGROUND OF THE INVENTION

1. Field of the Invention

The present invention relates to a method of manufacturing axis seals which restrain a flow of fluid in a direction of the rotation axis of a rotary machine such as a gas turbine and the like, axis seals, axis seal members and rotary machines using the axis seals.

2. Description of the Prior Art

A gas turbine which leads high temperature and high pressure gas to a turbine and expands it so as to generate motive power by converting the thermal energy of gas to kinetic rotational energy has a sealing mechanism (an axis seal) mounted thereto between the stationary vanes and the rotation axis in order to reduce an amount of high temperature and high pressure gas leaking from the high pressure side to the low pressure side. Conventionally, non-contact types of labyrinth seals are widely used as the sealing mechanism.

In the labyrinth seals, the amount of leaking gas is large because the clearance space at the tip of a fin must be made large to some extent in order that the tip of the fin will not come into contact during shaft vibration in the transient period of rotation or during transient time of thermal deformation. Leaf seals are developed to take the place of labyrinth seals as mentioned above, aiming at a reduction in the leaking amount.

FIG. 18 is a perspective view of an axis seal (referred as a "leaf seal" hereafter). The leaf seal 9A shown in FIG. 18 consists of a housing 92 which is arranged outside of a rotating axis 91 so as to surround the rotating axis 91; a low pressure side plate 93 which is mounted on the lower side of gas pressure of the housing 92; a high pressure side plate 94 which is mounted opposite to the low pressure side plate 93 and on the higher side of gas pressure; and thin metal plates 95.

The thin metal plates 95 are fitted and engaged into the housing 92 and laminated to the housing 92 in a ring shape. Additionally, the thin metal plates 95 separate the clearance space surrounding the rotation axis 91 into a high-pressure region and a low-pressure region by sealing the periphery of the rotation axis 91. Moreover, on both sides of the thin metal plates 95, the high-pressure side plate 94 is mounted in the high-pressure region and the low-pressure side plate 93 is mounted in the low-pressure region, each of which is mounted as a guide plate in a pressure-acting direction.

The thin metal plates 95 are designed so as to have a predetermined rigidity, which is determined by the thickness of the plate, in a circumferential direction of the rotation axis 91. Additionally, the thin metal plates 95 are mounted to the housing 92 in a manner that an angle made with the circumferential surface of the rotation axis 91 is to be an acute angle against the rotation direction of the rotation axis 91. When the rotation axis 91 stops, the tips of the thin metal plates 95 are in contact with the rotation axis 91 by a predetermined preload. However, when the rotation axis 91 rotates, the thin metal plates 95 and the rotation axis 91 are not in contact with each other because the tips of the thin metal plates 95 are raised by an effect of dynamic pressure caused by rotation of the rotation axis 91.

FIG. 19A and FIG. 19B show the front view and the side view of the thin metal plate 95 respectively. The portion 95d indicated with halftone dot meshing in FIG. 19B is a portion, which is to be eliminated by etching when the thin metal plate 95 is manufactured. When the thin metal plates 95 are laminated, the portions 95d to be eliminated by etching become a clearance space between the thin metal plates 95. In other words, the end portions 951 on the periphery of the thin metal plates 95 are arranged to be in contact with each other, while the end portions 952 on the opposite side of the end portion 951 are arranged so as not to be in contact.

In an axis sealing mechanism and a gas turbine that are constructed as described above, since the thin metal plates 95 having a width in the axial direction of the rotation axis 91 are laminated in a multiple number of layers in the circumferential direction of the rotation axis 91, these thin metal plates 95 have soft flexibility for the rotation axis 91 in the circumferential direction, and an axis sealing mechanism having high rigidity is constructed in the axial direction.

By having the space between the thin metal plates 95 made by the portions 95d where thin metal plates are eliminated, it is possible to arrange the thin metal plates 95 more closely and it is also possible to make the space between the tips of the thin metal plates 95 and the rotation axis 91 significantly small, compared with non-contact type of labyrinth seals and the like, whereby it is possible to reduce the amount of leaking gas to be approximately ⅓ to 1/10 of that of labyrinth seals.

The thin metal plate 95 is formed so as to obtain the predetermined shape by etching a steel plate, which is formed by rolling. At this time, only one side of the thin metal plate 95 is partially etched to be eliminated. However, in case of a thin plate of metal material (e.g. stainless, Inconel, Hastelloy and the like) of approximately 0.1 mm thickness manufactured by rolling, as shown in FIG. 19B, large residual stress (strain) occurs inside the metal material at the time of cold rolling.

When such a material having a large residual stress (strain) inside thereof as described above is thinned by etching only one side thereof in an above-mentioned manner, the distribution of residual stress (strain) becomes non-uniform, causing bending or warp.

For example, as shown in FIG. 20, when assumed tensile stresses are formed on both surfaces of a cold-rolled material and assumed compressive stresses are formed inside thereof, as a whole, the residual stresses on the surface and the residual stresses inside thereof will balance, maintaining the plane. However, as shown in FIG. 21, when a portion 950 of the surface on one side of the thin metal plate 95 is eliminated by etching, residual stresses remain in the central portion 95C and on the surface 95S, excluding the eliminated portion 950. Therefore, by having compressive stress acting on one side (in the central portion 95C) while having tensile stress acting on the other side (on the surface portion 95S), bending moments 9M occur, whereby the thin metal plate 95 warps in a direction toward the eliminated portion 950.

A multiple number of thin metal plates 95 are used for a leaf seal 9A. By having the thin metal plates 95 warped due to residual stress, the leaf seal 9A has portions containing non-uniform space generated here and there, and in these portions, a flow of gas occurs, whereby airtightness of the seal is sometimes lost.

Additionally, since the thin metal plates 95 warp in a direction opposite to the rotating direction of the rotation axis and the like facing to the seal 9A, there arises a possibility of the thin metal plates' 95 contacting with a rotation axis and the like due to shaft vibration during initiation of rotation or during a transition period of rotation such as stopping and the like, or due to a transient thermal deformation.

SUMMARY OF THE INVENTION

It is an object of the present invention to provide a method of manufacturing an axis seal which seals by laminating a plurality of thin metal plates into a shape of a ring and to provide a method of an manufacturing axis seal, in order to manufacture an axis seal which has a smaller amount of leaking gas, compared with an axis seal which uses conventional thin metal plates.

It is another object of the present invention to provide an axis seal, which can be assembled easily and can attempt to reduce the amount of leaking gas, in other words, to stabilize the characteristic of seal.

Furthermore, the present invention seeks to provide a rotary machine using an axis seal which has a stable characteristic of seal, thereby showing a stable performance thereof, and at the same time does not reduce mechanical efficiency thereof significantly without changing the axis seal for a long time.

In order to achieve the above-mentioned objects, according to the present invention, there is provided a method of manufacturing an axis seal formed by laminating axis seal members of thin films having flexibility so as to be in a shape of a ring; wherein, it is characterized by including a cutting process in which a roll of rolled metal material is cut into a predetermined size of a metal material plate; an etching process in which a multiple number of axis seal members of thin metal plates are produced by etching the only one side of the metal material plates that are cut off in the aforementioned cutting process, so as to thin them and provide them with a difference in level; a welding process in which the thin metal plates formed by etching in the aforesaid manner are arranged so as to be in a ring shape and to be oriented in the same direction, and are welded to the casing to be fixed; and the heat treatment process in which residual stresses are eliminated by heating the metal materials or the axis seal members.

In a preferred embodiment according to the present invention, there is provided an axis seal member constructing an axis seal which is manufactured by a method of manufacturing an axis seal including heat treatment processes inserted at an appropriate step between a plurality of processes and which seals a flow in an axial direction of the rotation axis; wherein, an axis seal member is characterized by being a flat plate having no strain or almost having no strain.

In a further preferred embodiment according to the present invention, there is provided an axis seal which is manufactured by a method of manufacturing an axis seal including heat treatment processes inserted at an appropriate step between a plurality number of processes and which seals a flow in an axial direction of the rotation axis; an axis seal which is characterized by:

wherein, the axis seal members are formed so as to have no strain or to almost have no strain and are laminated in a ring shape;

wherein the axis seal members are arranged so as to contact the rotation axis when the rotation axis stops; and wherein, the tips of the axis seal members slightly rise from the rotation axis due to dynamic pressure caused by rotation when the rotation axis rotates.

In a further preferred embodiment according to the present invention, there is provided a rotary machine having an axis seal which separates the space surrounding the rotation axis into the high pressure region and the low pressure region; a rotary machine using an axis seal which is characterized by:

wherein, the axis seal is configured in a manner that a multiple number of axis seal members are laminated in a ring shape;

wherein, axis seal members are manufactured by a method of an axis seal including heat treatment processes at an appropriate step between a plurality number of manufacturing processes of an axis seal; and wherein, the axis seal members are flat plates having no strain or almost having no strain.

DESCRIPTION OF THE DRAWINGS

FIG. 6 is a flow chart of a manufacturing process of an axis seal.

DESCRIPTION OF THE PREFERRED EMBODIMENTS

Figure 1A:
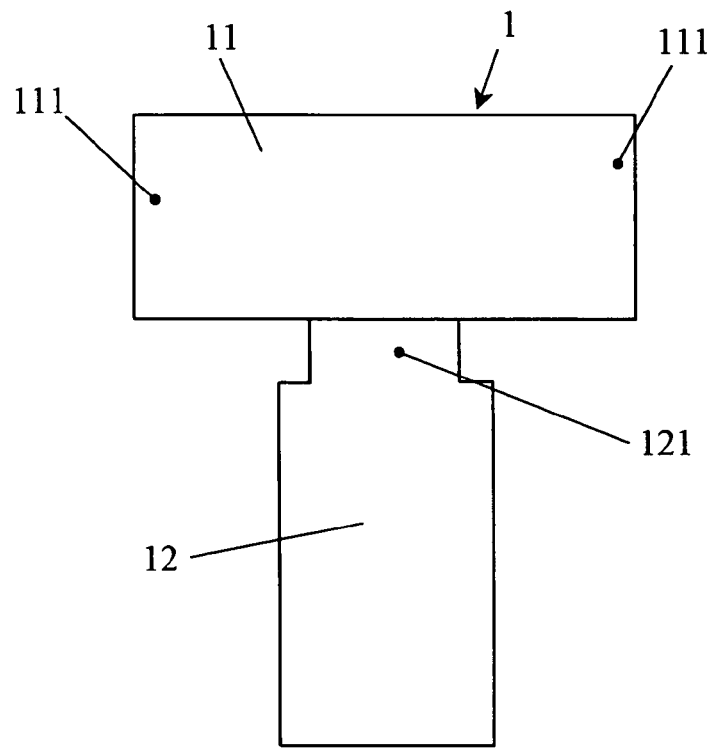
FIG. 1A is a front view of a thin metal plate which is an axis seal member in accordance with an embodiment of the prevent invention.

Referring now to the drawings, an embodiment of the present invention will be described hereinafter.

Figure 1B:
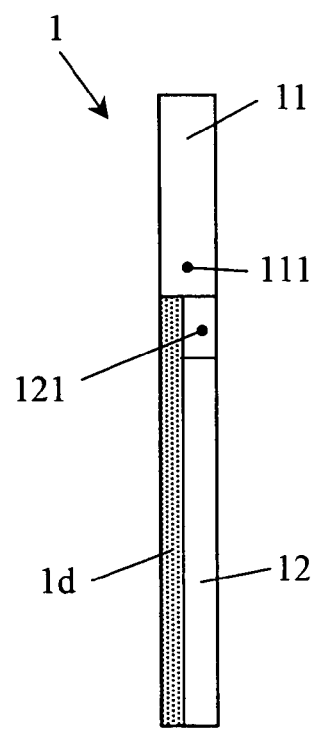
FIG. 1B is a side view of the thin metal plate shown in FIG. 1A.
Figure 2A:
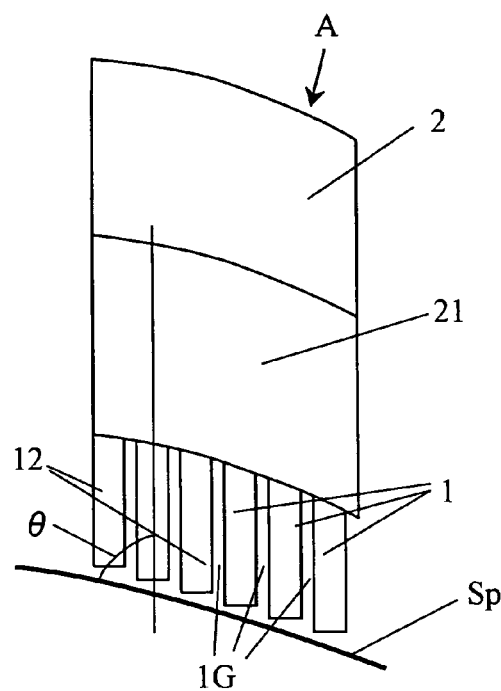
FIG. 2A is a side view of an axis seal in accordance with the embodiment of the present invention.
Figure 2B:
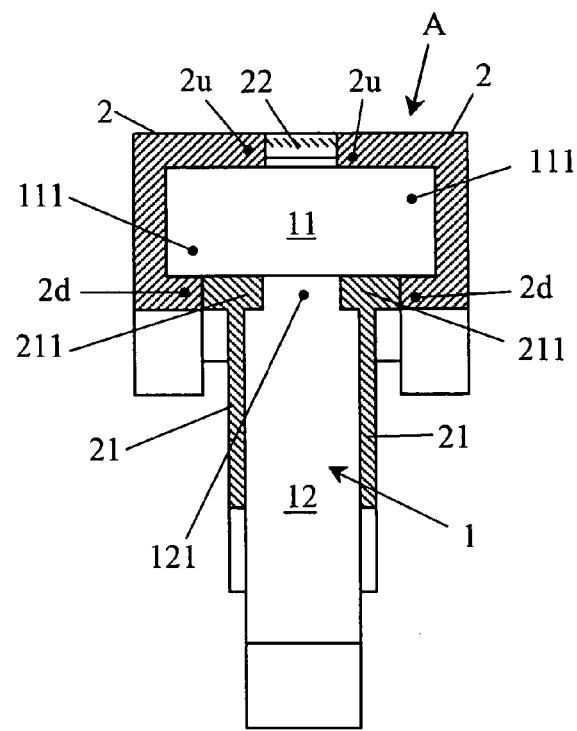
FIG. 2B is a cross-sectional view of an axis seal.
Figure 2C:
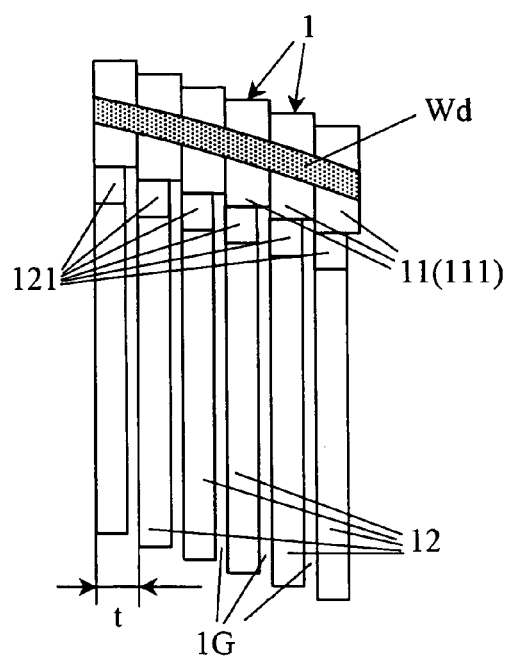
FIG. 2C is a side view of an axis seal which has housings and side plates removed.
Figure 2D:
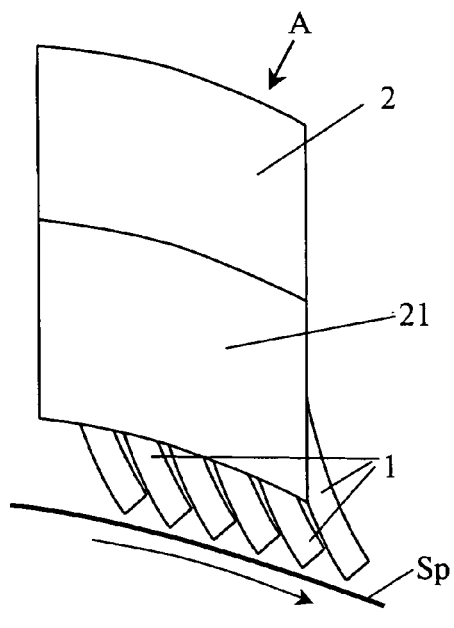
FIG. 2D depicts an action of the axis seal when the axis is rotating.

FIG. 1A is a front view and FIG. 1B is a side view of a thin metal plate of an axis seal member in accordance with the embodiment of the present invention. FIG. 2A is a side view of an axis seal (referred as a "leaf seal" hereinafter) in accordance with the embodiment of the present invention, wherein a portion is partially cut off. FIG. 2B is a cross-sectional drawing of a leaf seal in accordance with the embodiment of the present invention. FIG. 2C is a side view of a leaf seal shown in FIG. 2B when the housings and the side plates thereof are removed. FIG. 2D is a side view of a leaf seal in accordance with the embodiment of the present invention when it is in a state of working.

As shown in FIG. 1A and FIG. 1B, a thin metal plate 1 has an edge portion 11 on the upper side in the figure (on the side of the periphery thereof when it is formed as a leaf seal) formed so as to be laterally long. Also, as shown in FIG. 1B, a tip 12 of the thin metal plate 1 on the lower side in the figure is formed to be thinner than the remaining portions by having one side eliminated.

In addition, the thin metal plate 1 has a connecting portion 121 which connects the tip 12 to the edge portion 11 on the periphery, and is formed to be more slender than the remaining portions. After a plurality of thin metal plates 1 are laminated and fixed by welding, a tip 211 of a side plate 21 which will be described hereinafter is fit to the slender portion 121.

In FIG. 1B, a portion 1d indicated with halftone dot meshing is a portion to be eliminated by etching during manufacturing of the above-mentioned thin metal plate 1. When thin metal plates 1 are laminated, the portion 1d to be eliminated by etching becomes a clearance space between the thin metal plates 1. In other words, the edge portions 11 on the periphery of the thin metal plates 1 are arranged so as to contact with each other, whereas the tips 12 on the opposite side are arranged so as not to be in contact.

The leaf seal A shown in FIG. 2A through FIG. 2D is equipped with a thin metal plate 1 in a letter "T" shape viewed from the top; housings 2 catching the edge portion 11 on the periphery of a multiple number of laminated thin metal plates 1 from both sides; side plates 21 arranged along the tip 12 in the lower part of the housings 2; and a connection member 22 connecting the housings 2 on the right and on the left.

As shown in FIG. 2B and FIG. 2C, after arranging the thin metal plates 1 in a ring shape along the curved surface, the thin metal plates 1 are fixed to each other by welding Wd of both sides 111 of the edge portions 11 on the upper side of the thin metal plates 1 (on the periphery side when the thin metal plates 1 are formed as a leaf seal).

Then, the tips 211 of side plates 21 are arranged in a manner that the slender portions 121 of the tips 12 of the thin metal plates 1 fixed by welding are fit to the tips 211 of side plates 21. (See FIG. 2B).

Thereafter, the housings 2 are installed so as to catch both sides 111 of the edge portions 11, when the lower edges 2d of the housings 2 are pressing the tips 211 of the side plates 21 from the outside. Additionally, the housings 2 support the thin metal plates 1 by arranging the connection member 22 between the upper edge portions 2u on both right and left sides and fixing them with a fixing method which does not give an adverse effect to an action of the leaf seal. Welding, bolting and the like, although not limited to, are among methods of fixing the housings 2, the side plates 21 and the connection member 22.

The thin metal plates 1 laminated in a multiple number of layers are arranged so as to have the edge portions 11 on the upper side thereof contact each other and are fixed. However, in the tips 12, a portion thereof, which is thinner than the remaining portion, acts as a clearance gap. A clearance gap 1G has a uniform size at any location. (See FIG. 2A and FIG. 2C).

A thin metal plate 1 is designed so as to have a predetermined rigidity, which is determined by plate thickness t, in a circumferential direction of a rotation axis Sp. Also, thin metal plates 1 are installed to the housings 2 in a manner that the angle θ made with a phase of the rotation axis Sp in the rotation direction of the rotation axis Sp is an acute angle. When the rotation of the rotation axis Sp stops, the tips 12 of the thin metal plates 1 are in contact with the rotation axis Sp due to a predetermined preload; whereas, when the rotation axis Sp rotates, the tips 12 of the thin metal plates 1 rise upward due to dynamic effect caused by rotation of the rotation axis Sp, thereby causing the thin metal plates 1 not to be in contact with the rotation axis Sp. (See FIG. 2D). The seal leaf A divides a space surrounding the rotation axis Ap into a high-pressure region and a low-pressure region by sealing the periphery of the rotation axis Sp.

This leaf seal A makes the periphery side thereof to be fixed to the housings 2 be rigid in an axial direction of the rotation axis Sp by laminating the thin metal plates 1 of sealing members in an axial direction of the rotation axis Sp, thereby making it possible to maintain sealing performance under a condition of higher differential pressure. Additionally, the existence of the clearance gap 1G provides advantages in that the seal is not broken during rotation and in that durability is high.

Figure 3:
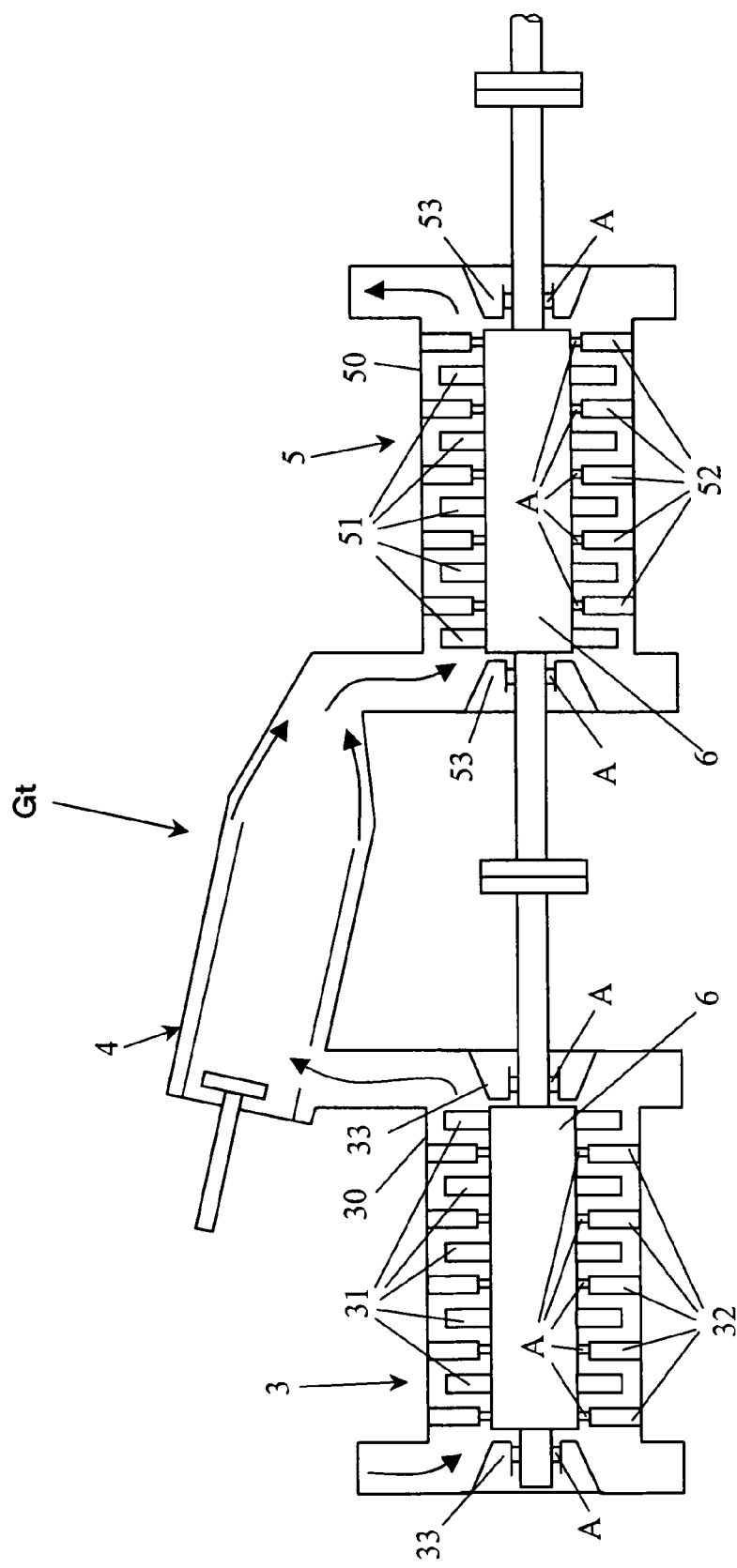
FIG. 3 is a layout drawing of a gas turbine.

FIG. 3 shows a layout of a gas turbine which is a rotary machine using a leaf seal shown in FIG. 2A through FIG. 2D. A gas turbine Gt shown in FIG. 3 comprises a compressor 3 which takes in an amount of air inside thereof and compresses it; a combustor 4 which mixes the air compressed by the compressor 3 with fuel and burns it; a turbine 5 which is rotated by combustion gas by introducing the combustion gas generated in the combustor 4 into the inside thereof and expanding it therein; and a rotation axis 6 which is fixed relatively to the turbine 5. The gas turbine Gt generally utilizes a part of power, which is obtained by the rotation axis, as a power of the compressor 3.

The turbine 5 converts the thermal energy of combustion gas into the kinetic rotational energy by blowing combustion gas to rotating blades 51 installed to the rotation axis 6 and generates the power. The turbine 5 is equipped with a plurality of stationary vanes 52 that are mounted to a casing 50 of the turbine 5 as well as with a plurality of rotating blades 51 mounted to the rotation axis 6, and these rotating blades 51 and stationary vanes 52 are arranged alternately in an axial direction of the rotation axis 6. The rotating blades 51 rotate the rotation axis 6 by receiving pressure of the combustion gas flowing in an axial direction of the rotation axis 6, and the rotational energy supplied to the rotation axis 6 is taken out from the end of the axis and is used. Between the stationary vanes 52 and the rotation axis 6, a leaf seal A is installed as an axis seal for a purpose of reducing the amount of combustion gas leaking from the high pressure side to the low pressure side.

Additionally, the compressor 3 is connected coaxially to the turbine 5 by the rotation axis 6 and compresses fresh air by utilizing rotation of the turbine 5 so as to supply compressed air to the combustor 4. The compressor 3 has a plurality of rotating blades 31 mounted to the rotation axis 6 and a plurality of stationary vanes 32 mounted to a casing 30 of the compressor 3 in the same manner as the turbine 5 and has the rotating blades 31 and the stationary vanes 32 arranged alternately in an axial direction of the rotation axis 6. Between the stationary vanes 32 and the rotation axis 6, a leaf seal A is installed for a purpose of reducing the amount of compressed air leaking from the high pressure side to the low pressure side.

Moreover, a bearing portion 33 in which the casing 30 of the compressor 3 supports the rotation axis 6 and a bearing portion 53 in which the casing 50 of the turbine 5 supports the rotation axis 6 have a leaf seal A installed thereon as an axis seal to prevent compressed air or combustion gas from leaking from the high pressure side to the low pressure side.

The axis seal and the gas turbine constructed as mentioned above, have thin metal plates 1 having a width thereof in an axial direction of the rotation axis Sp laminated in a multiple number of layers in a circumferential direction of the rotation axis Sp, wherein the thin metal plates 1 have soft flexibility in a circumferential direction of the rotation axis Sp, thus constituting an axis seal having high rigidity in an axial direction.

In the embodiment of the present invention mentioned above, an adoption of a leaf seal to a gas turbine is exemplified. However, a leaf seal is not limited to this adoption but can be adopted widely to what can convert an energy into a duty due to a relation between the rotation of an axis and the flow of a fluid, for example, to a steam turbine, a compressor and the like. A leaf seal can be used to restrain the flow of a fluid in an axial direction of a rotation axis as well.

Figure 4:
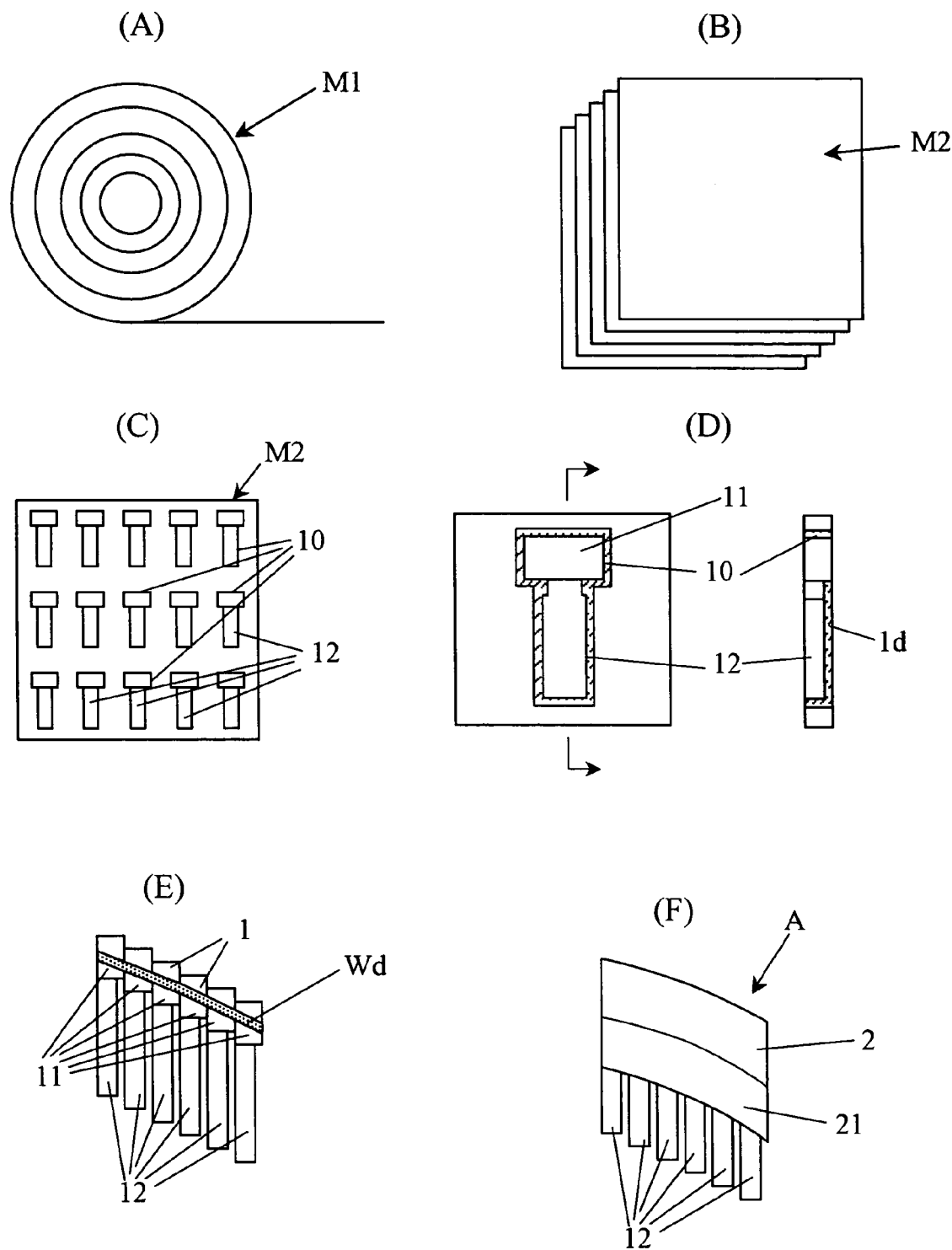
FIG. 4 depicts manufacturing processes of an axis seal.

In FIG. 4, (A) through (F) show processes of manufacturing a thin metal plate from a metal material plate.

As shown in FIG. 4, a plurality of thin metal plates 1 are manufactured from metal material plates by etching. First, a roll of rolled metal material M1 is cut out into an optimum size to be subjected to the following processing step so as to form metal material plates M2 of a predetermined size. (See (A) and (B)). Outline portions 10 of thin metal plates 1 and tips 12 of the thin metal plates 1, which are to define a clearance gap 1d when the leaf seal A is assembled, are eliminated by etching from a first surface of the metal material plates M2. (See (C) and (D)). Thereafter, by etching only the outline portions 10 of the thin metal plates 1 from the opposite side, thin metal plates 1 are cut out from the metal material plate M2. (See (D)). In the etching of the thin metal plates 1, an etching amount (the thickness of a plate) is controlled by adjusting the etching time.

The thin metal plates 1 shown in FIG. 4 (E) are laminated in a ring shape with the portions 1d eliminated by etching, heading in the same direction, and have both sides of the upper edge portions 11 extending to right and left are welded, thereby fixing the thin metal plates 1 to each other. The thin metal plates 1 which are laminated so as to be oriented in the same direction and welded have the upper edge portions 11 thereof fit and engaged into the housings 2 on both sides, and by mutually fixing both sides of the housings 2, the laminated thin metal plates 1 are fixed. (See (F)).

FIG. 5 shows a process of heat treatment in accordance with the embodiment of the present invention.

Figure 5A:
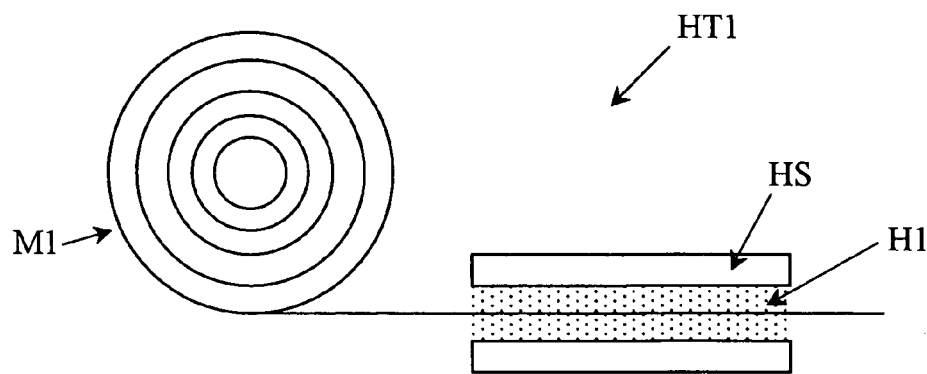
FIG. 5A through FIG. 5D depict examples of heat treatment processes respectively.

In a heat treatment method HT1 shown in FIG. 5A, a roll of rolled metal M1 is expanded by being transmitted at a predetermined speed and is heated with a heating equipment HS, thereby removing residual stress (strain). Since heating H1 with the heating equipment HS is included as a part of a process, wherein a roll of rolled metal M1 is expanded and cut out into metal material plates M2, and since a volume of the metal M1 is small whereby the holding time is reduced so as to be short, it is possible to shorten the production process.

Figure 5B:
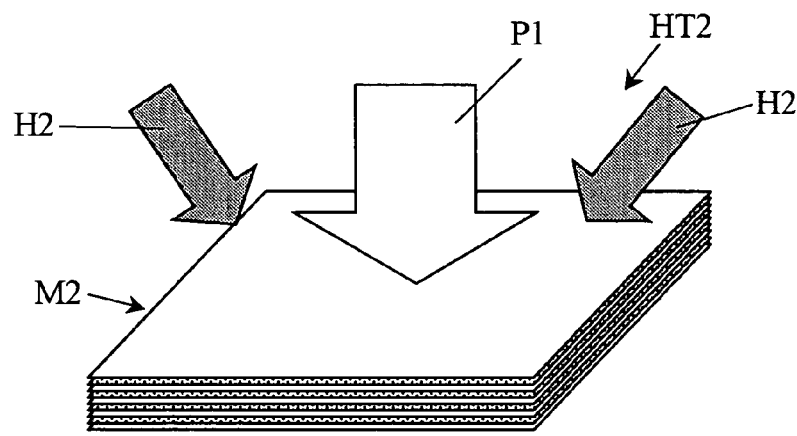

In a heat treatment method HT2 shown in FIG. 5B, residual stress (strain) is eliminated by laminating the metal material plates M2 so as to be subjected to weighting with P1 (dead weight+weight) and heating H2. This method can use an existing ordinary electric furnace, thus achieving a low cost. In addition, since laminated thin plates provide a relatively uniform temperature distribution during heat treatment and during post-heat-treatment cooling, deformation of the thin plates after heat treatment, especially deformation at the edge portions due to non-uniform cooling, is small, thereby obtaining a material of good quality, and having good flatness.

Figure 5C:
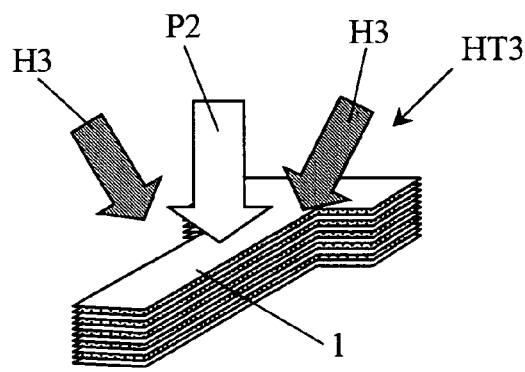

In a heat treatment method HT3 shown in FIG. 5C, by etching the metal material plates M2 after a plurality of thin metal plates 1 (axis seal members) are manufactured, and by laminating the thin metal plates 1 and heating H3 them while weighting with P2 (dead weight+weight), residual stress (strain) is eliminated. Since the thin metal plates 1 are small, there is an advantage in that heating equipment becomes smaller.

Figure 5D:
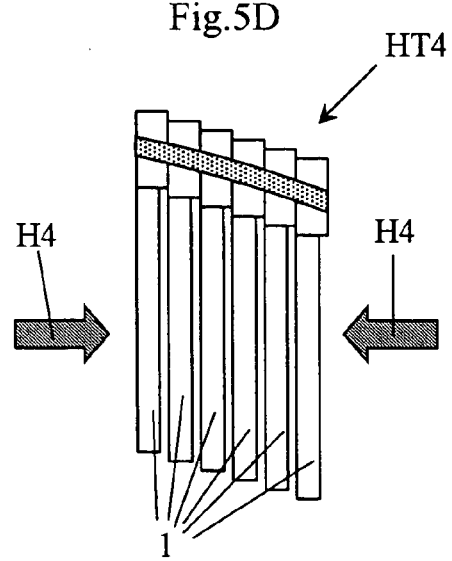

In a heat treatment method H4 shown in FIG. 5D, by heating H4 after the thin metal plates 1 are laminated and welded, residual stress is eliminated from the thin metal plates 1. This method provides easier handling because the thin metal plates 1 are welded. Moreover, welding makes it possible to get rid of accumulated residual stress at the same time.

A First Embodiment of a Manufacturing Method in Accordance With the Present Invention FIG. 6 shows a flow chart of a manufacturing process of an axis seal in accordance with an embodiment of the present invention.

A leaf seal A manufactured by a manufacturing process shown in FIG. 6 is an axis seal which seals low temperature fluid, and although not limited to this leaf seal, a leaf seal A is formed of stainless steel.

First, a metal formed by cold rolling so as to obtain a predetermined thickness has residual stress (strain) accumulated inside thereof. Therefore, in order to eliminate the residual stress (strain), heat treatment (heating at 740° C. for 30 minutes and then cooling) is performed by transmitting a roll of rolled metal material M1 little by little. (See FIG. 5A). (Step S11)

Subsequently, a roll of rolled metal material M1 is cut out into a predetermined size. (Step S12) From the cut-out metal material plate M2, thin metal plates 1 are manufactured by etching the outline portions 10 from both sides and by etching the tips 12 from one side. (Step S13) A plurality number of the thin metal plates 1 manufactured in Step S13 are laminated so as to be oriented in the same direction and to be in a ring shape, and are fixed to each other by welding both right and left sides 111 of the upper edge portions 11. (Step S14) After fixing a plurality number of the thin metal plates 1 in the laminated state, the upper edge portions are fixed with the housings 2, the side plates 21 and the connection member 22 (Step S15), thus manufacturing a leaf seal.

In manufacturing a leaf seal by using the above-mentioned method, since heat treatment is performed while a roll of rolled metal material M1 is being transmitted, heat treatment can be executed continually, thereby shortening the production process. Additionally, since the production process is shortened, it is possible to achieve low cost for that much.

Figure 7:
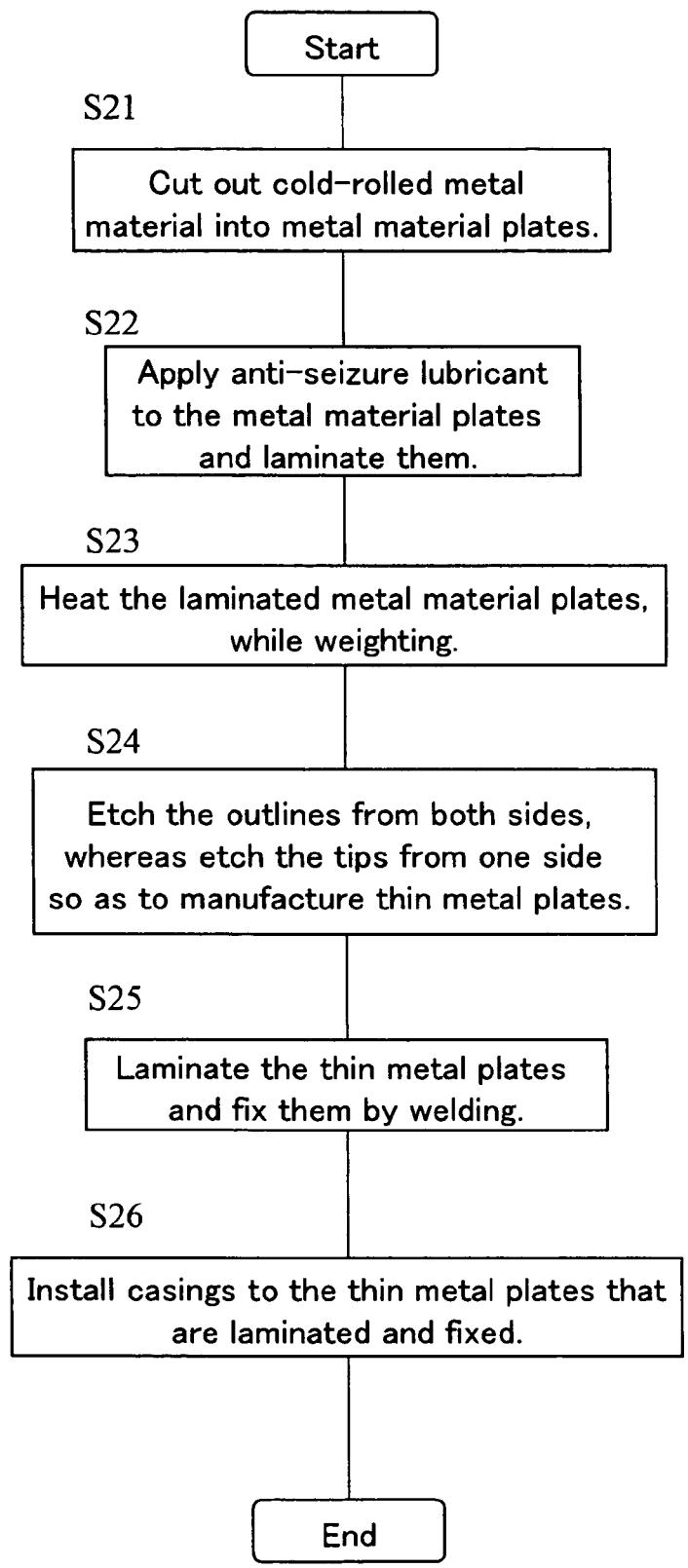
FIG. 7 is a flow chart of a manufacturing process of an axis seal.

A Second Embodiment of a Manufacturing Method in Accordance With the Present Invention FIG. 7 shows a flow chart of a manufacturing process of an axis seal in accordance with an embodiment of the present invention.

A roll of rolled metal material M1 is cut out into metal material plates M2 of a predetermined size to be suitable for processing. (Step S21) A plurality of the metal material plates M2 that are cut out into a predetermined size in Step S21 are arranged so as to be piled up, when anti-seizure lubricant is applied to spaces between the metal material plates M2. (Step S22) Thereafter, the metal material plates M2 laminated in Step S22 are heated (at 680° C. for four hours), with weighting, whereby residual stress (strain) is eliminated from the metal material plates M2. (See FIG. 5B). (Step S23)

Subsequently, the thin metal plates 1 are manufactured by having the portions of the metal material plates M2 which correspond to the outline portions 10 of the thin metal plates 1 etched from both sides and by having portions corresponding to the tips 12 etched from one side. (Step S24) A plurality of the thin metal plates 1 manufactured in Step S24 are laminated so as to be oriented in the same direction and to be in a ring shape and are fixed to each other by welding both right and left sides 111 and 111 of the upper edge portions 11. (Step S25) After fixing a plurality of the thin metal plates 1 in the laminated state, the upper edge portions thereof are fixed with the housings 2, the side plates 21 and the connection member 22 (Step S26), thus manufacturing a leaf seal.

Manufacturing an axis seal in the above-mentioned manner makes it possible to use an existing ordinary electric furnace, thus achieving low cost. In addition, since the laminated thin plates provide a relatively uniform temperature distribution during heat treatment and during post-heat-treatment cooling, deformation of the thin plates after heat treatment, especially deformation at the edge portions due to non-uniform cooling, is small, thereby obtaining a metal material plates M2 of good quality and having good flatness.

Since this method is subject to batch processing, it is effective in case of a relatively small number of treatments.

Figure 8:
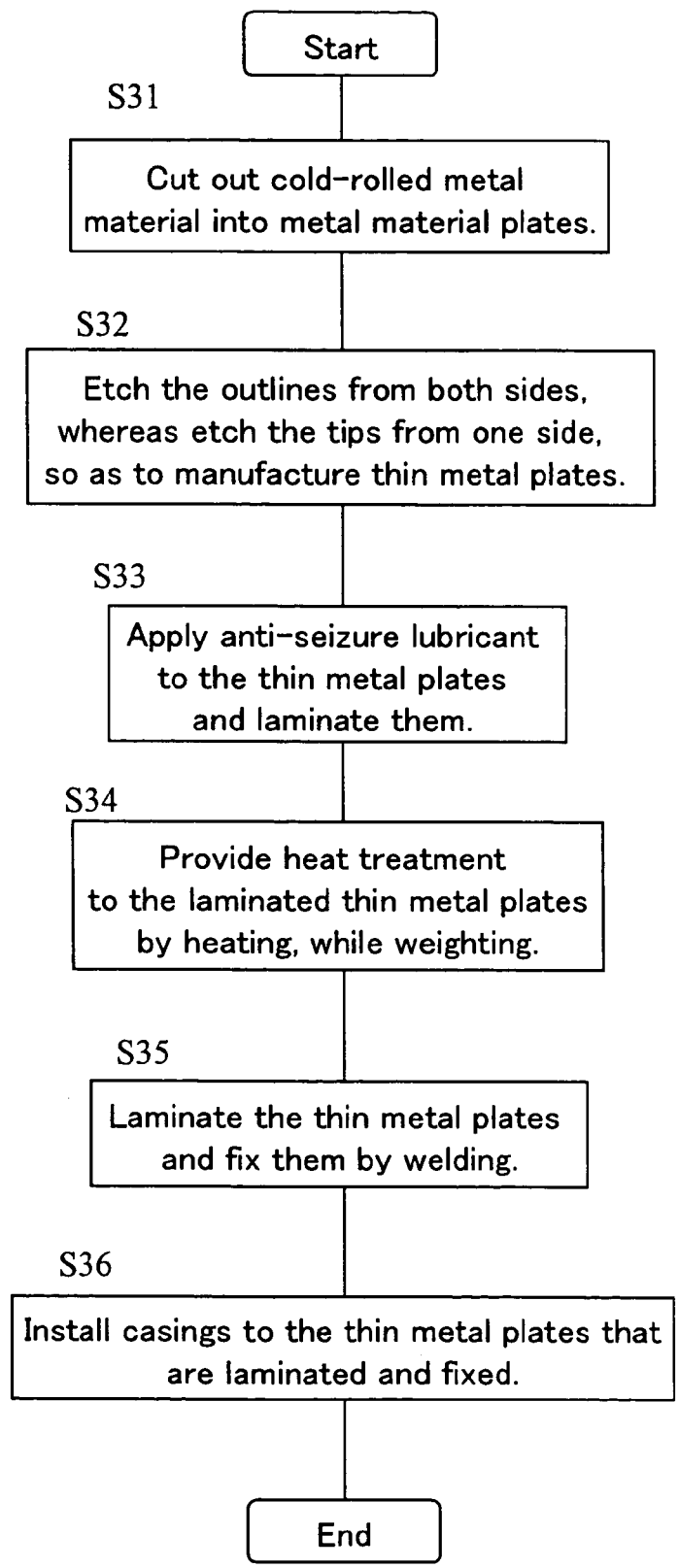
FIG. 8 is a flow chart of a manufacturing process of an axis seal.

A Third Embodiment of a Manufacturing Method in Accordance With the Present Invention FIG. 8 shows a flow chart of a manufacturing process of an axis seal in accordance with an embodiment of the present invention.

A roll of rolled metal material M1 is cut out into metal material plates M2 of a predetermined size to be suitable for processing. (Step S31) Thin metal plates 1 are manufactured by having the portions of the metal material plates M2 cut out in Step S31 that correspond to the outline portions 10 of the thin metal plates 1 etched from both sides and by having the portions corresponding to the tips 12 etched from one side. (Step S32) The thin metal plates 1 formed in Step S32 are laminated so as to be oriented in a predetermined direction. (Step S33) The thin metal plates 1 piled up in Step S33 are heated (at 680° C. for four hours), weighting, thereby eliminating residual stress (strain) from the thin metal plates. (See FIG. 5C). (Step S34)

Thereafter, the thin metal plates are laminated in a ring shape and both right and left sides 111 of the upper edge portions 11 are welded. (Step S35) After fixing a plurality of the thin metal plates 1 in the laminated state, the upper edge portions thereof are fixed with the housings 2, the side plates 21 and the connection member 22 (Step S36), thus manufacturing a leaf seal A.

Figure 9:
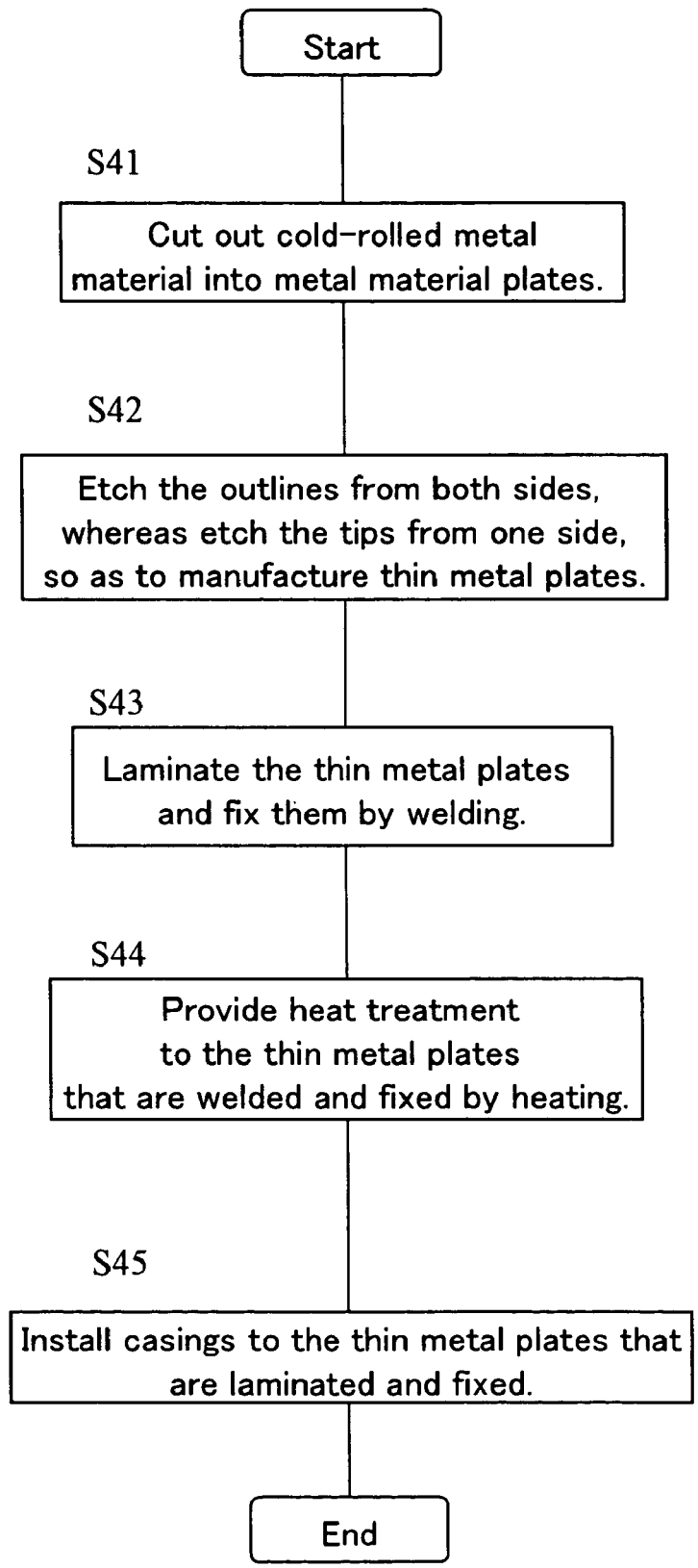
FIG. 9 is a flow chart of a manufacturing process of an axis seal.

A Fourth Embodiment of a Manufacturing Method in Accordance With the Present Invention FIG. 9 shows a flow chart of a manufacturing process of an axis seal in accordance with an embodiment of the present invention.

A roll of rolled metal material M1 is cut out into metal material plates M2 of a predetermined size to be suitable for processing. (Step S41) Thin metal plates 1 are manufactured by having the portions of the metal material plates M2 cut out in Step S41 which correspond to the outline portions 10 of the thin metal plates 1 etched from both sides and by having the portions corresponding to the tips 12 etched from one side as mentioned above. (Step 42)

A plurality of thin metal plates 1 are laminated, heading in the same direction, and are fixed to each other by welding both right and left edge portions 111 of the upper edge portions 11. (Step S43) After being fixed in Step S43, the thin metal plates 1 in lamination layers are heated (at 680° C. for four hours) so as to eliminate residual stress (strain) which is accumulated inside of the thin metal plates 1. (See FIG. 5D). (Step S44) Thereafter, the upper edge portions are fixed with the housings 2, the side plates 21 and the connection member 22 (Step S45), thus manufacturing a leaf seal.

The above embodiments are methods of manufacturing axis seals to be used where fluid of relatively low temperature (up to approximately 400° C.) is handled. The above-mentioned four methods are examples of manufacturing methods of a leaf seal, but not limited to. Temperatures and times of heat treatment are not limited to the above, but it is possible to adopt manufacturing methods widely that can release residual stress (strain) accumulated on a metal plate.

Figure 10:
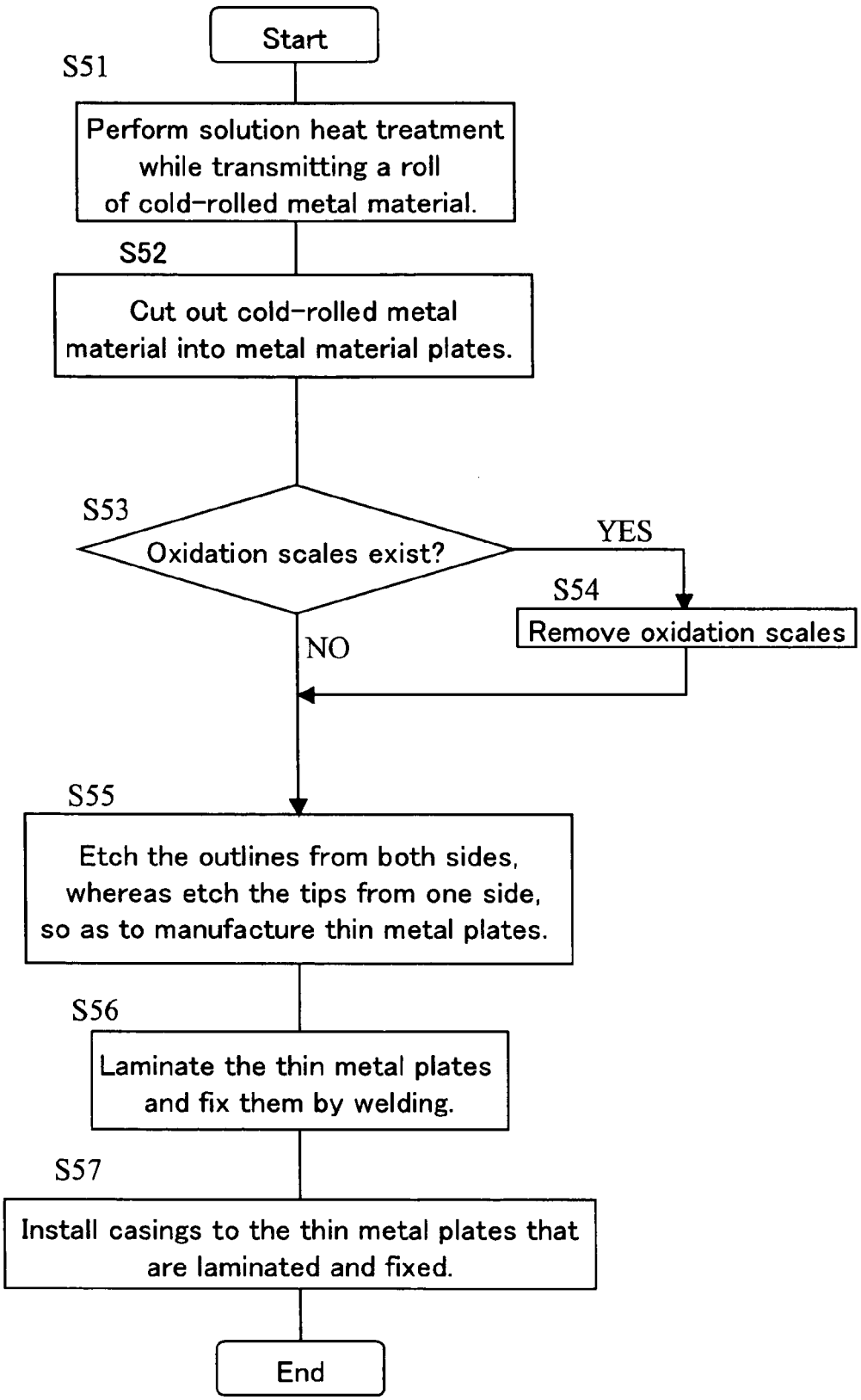
FIG. 10 is a flow chart of a manufacturing process of an axis seal.

A Fifth Embodiment of a Manufacturing Method in Accordance With the Present Invention Next FIG. 10 shows a flow chart of a manufacturing process of an axis seal in accordance with an embodiment of the present invention.

An axis seal A manufactured in a manufacturing process shown in FIG. 10 is an axis seal which seals fluid of relatively high temperature (for example, more than 400° C.), and although not limited to, an axis seal is to consist of Inconel material herein.

Rolls of rolled metal materials that are formed by cold rolling so as to have a predetermined thickness have residual stress (strain) accumulated inside thereof. In order to eliminate the residual stress (strain), solution heat treatment is performed by transmitting rolls of rolled metal materials M1 little by little. (See FIG. 5A). (Step S51) Solution heat treatment is a treatment, wherein a metal is held at a predetermined temperature for a predetermined time and subsequently, by cooling the metal rapidly, alloy elements and deposits are solved into matrix. Temperature and time conditions at this time are 980° C. and 30 minutes herein, but are not limited thereto. Subsequently, a roll of cold-rolled metal material M1 is cut out into a predetermined size so as to be easy for processing. (Step S52)

Next, it is checked if oxidation scales have occurred on the surface of the metal material plates M2. (Step S53) In case of presence of oxidation scales (in case of YES in Step S53), oxidation scales are removed by soaking the metal material plates into an acid or alkali liquid. (Step S54)

When oxidation scales are not observed (in case of NO in Step S53) or after oxidation scales are got rid of in Step S54, the portions corresponding to the outline portions of the thin metal plates 1 are etched from both sides and the portions corresponding to the tips 12 thereof are etched from one side as mentioned above, thereby manufacturing thin metal plates 1. (Step S55) A plurality number of the thin metal plates 1 manufactured in Step S55 are laminated so as to orient to the same direction and to be in a ring shape and are fixed to each other by welding both right and left sides 111 and 111 of the upper edge portions thereof. (Step S56) After a plurality number of thin metal plates 1 are fixed in laminated state by welding, the upper edge portions thereof are fixed with the housings 2, the side plates 21 and the connection member 22 (Step S57), thus manufacturing a leaf seal.

Figure 11:
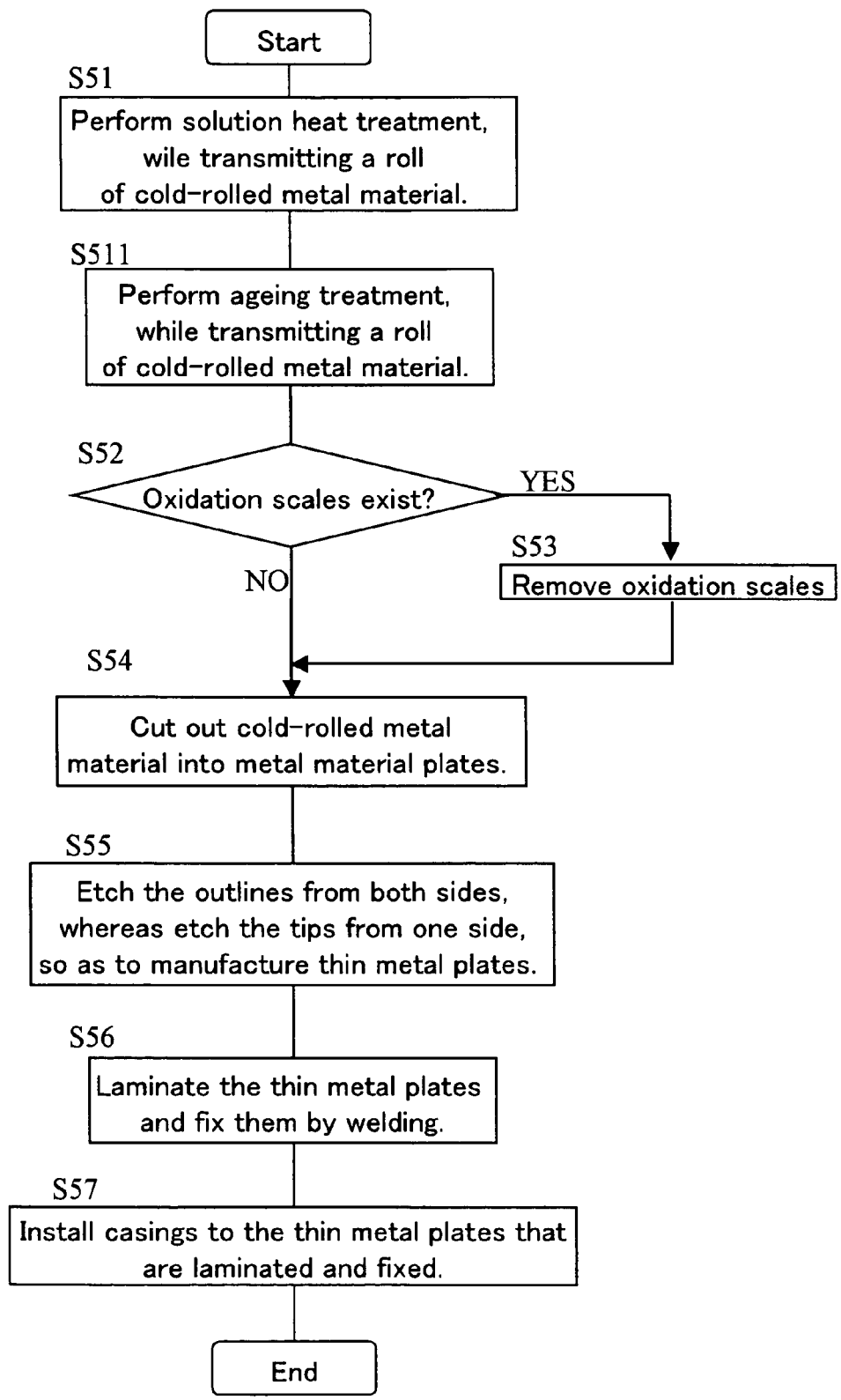
FIG. 11 is a flow chart of a manufacturing process of an axis seal.

Additionally, as shown in FIG. 11, a treatment, as an ageing treatment (Step S511), may be included;

wherein, after solution heat treatment (Step S51), the roll of rolled metal material M1 are held at 732° C. for eight hours;

wherein the temperature is decreased down to 621° C., at which the thin metal plates are held for ten hours; and wherein, the thin metal plates are cooled. By performing solution heat treatment, it is possible or it is almost possible to eliminate residual stress (strain). However, ageing treatment makes it possible to eliminate residual stress (strain) and to obtain strength at high temperature as well.

Furthermore, a method is exemplified that acid or alkali liquid is used for washing in order to get rid of oxidation scales, but not limited to, and mechanical grinding with a grinder, for example, can be used. Also, it is not limited to the above-mentioned means, but it is possible to adopt means widely that can eliminate oxidation scales so as not to let them remain on the surfaces which are subject to etching.

Figure 12:
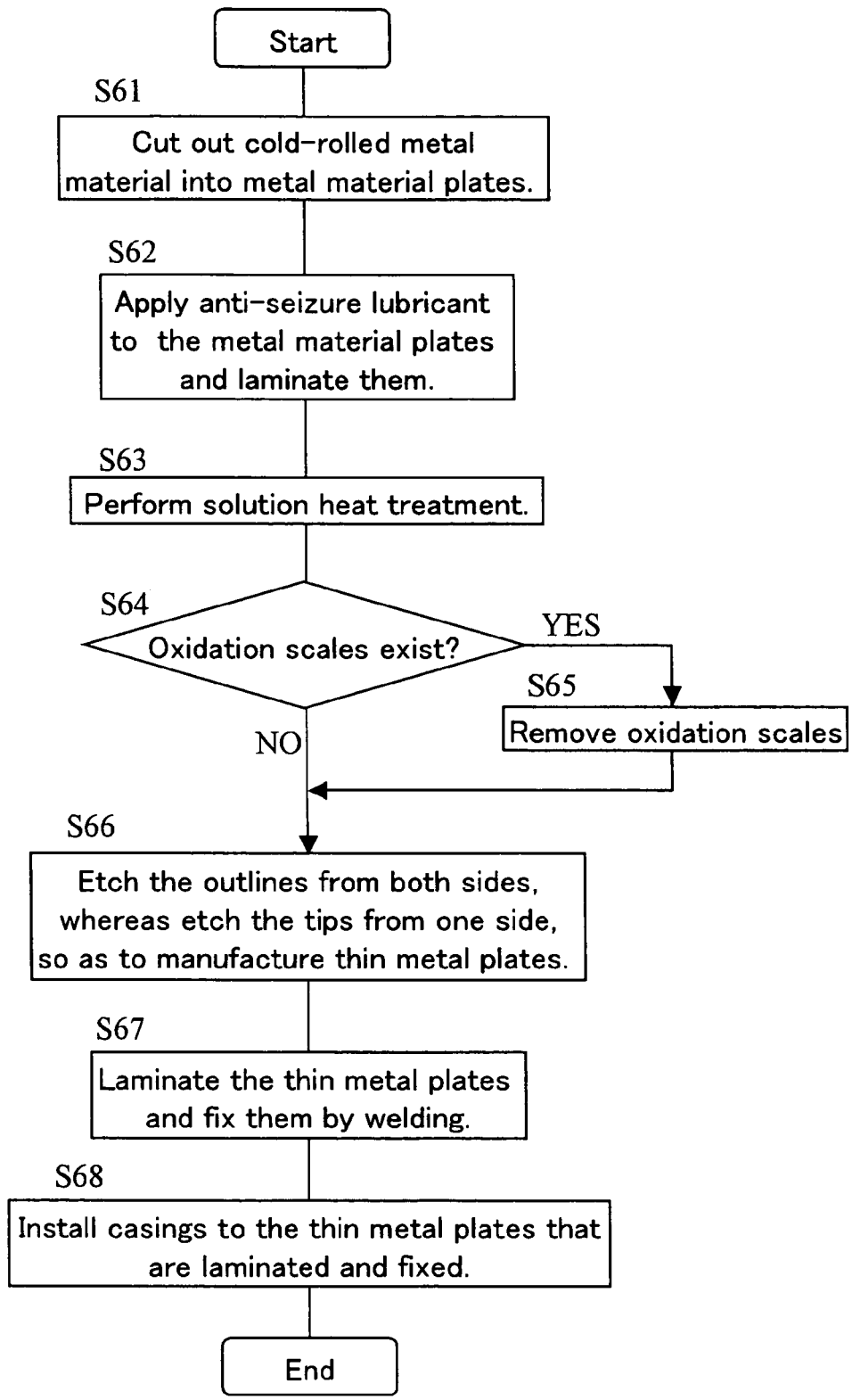
FIG. 12 is a flow chart of a manufacturing process of an axis seal.

A Sixth Embodiment of a Manufacturing Method in Accordance With the Present Invention FIG. 12 shows a flow chart of a manufacturing process of an axis seal in accordance with an embodiment of the present invention.

A roll of rolled metal material M1 is cut out into predetermined size of metal material plates M2. (Step S61) A plurality number of metal material plates M2 cut out into a predetermined size in Step S61 are arranged so as to be piled up each other, when anti-seizure lubricant is applied to the space between the metal material plates M2. (Step S62) Thereafter, by heating the metal material plates M2 laminated in Step S62 (at 982° C. for 30 minutes), solution heat treatment is supplied so as to eliminate residual stress (strain) from the metal material plates. (See FIG. 5B). (Step S63)

Subsequently, it is checked if oxidation scales have occurred on the surfaces of metal materials. (Step S64) In case of occurrence of oxidation scales (in case of YES in Step S64), oxidation scales are got rid of by soaking the metal material plates M2 in acid or alkali liquid. (Step S65)

When oxidation scales are not observed (in case of NO in Step S64) or after oxidation scales are got rid of in Step S65, the portions of the cut-out metal material plates M2 which correspond to the outline portions 10 of the thin metal plates 1 are etched from both sides and the portions corresponding to the tips 12 are etched from one side as mentioned above, thereby manufacturing thin metal plates 1. (Step S66) A plurality number of thin metal plates 1 manufactured in Step S66 are laminated so as to orient to the same direction and to be in a ring shape and are fixed to each other by welding both right and left sides 111 and 111 of the upper edge portions 11 thereof. (Step S67) After fixing a plurality number of thin metal plates 1 in laminated state, the upper edge portions thereof are fixed with the housings 2, the side plates 21 and the connection member 22 (Step S68), thereby manufacturing a leaf seal.

Figure 13:
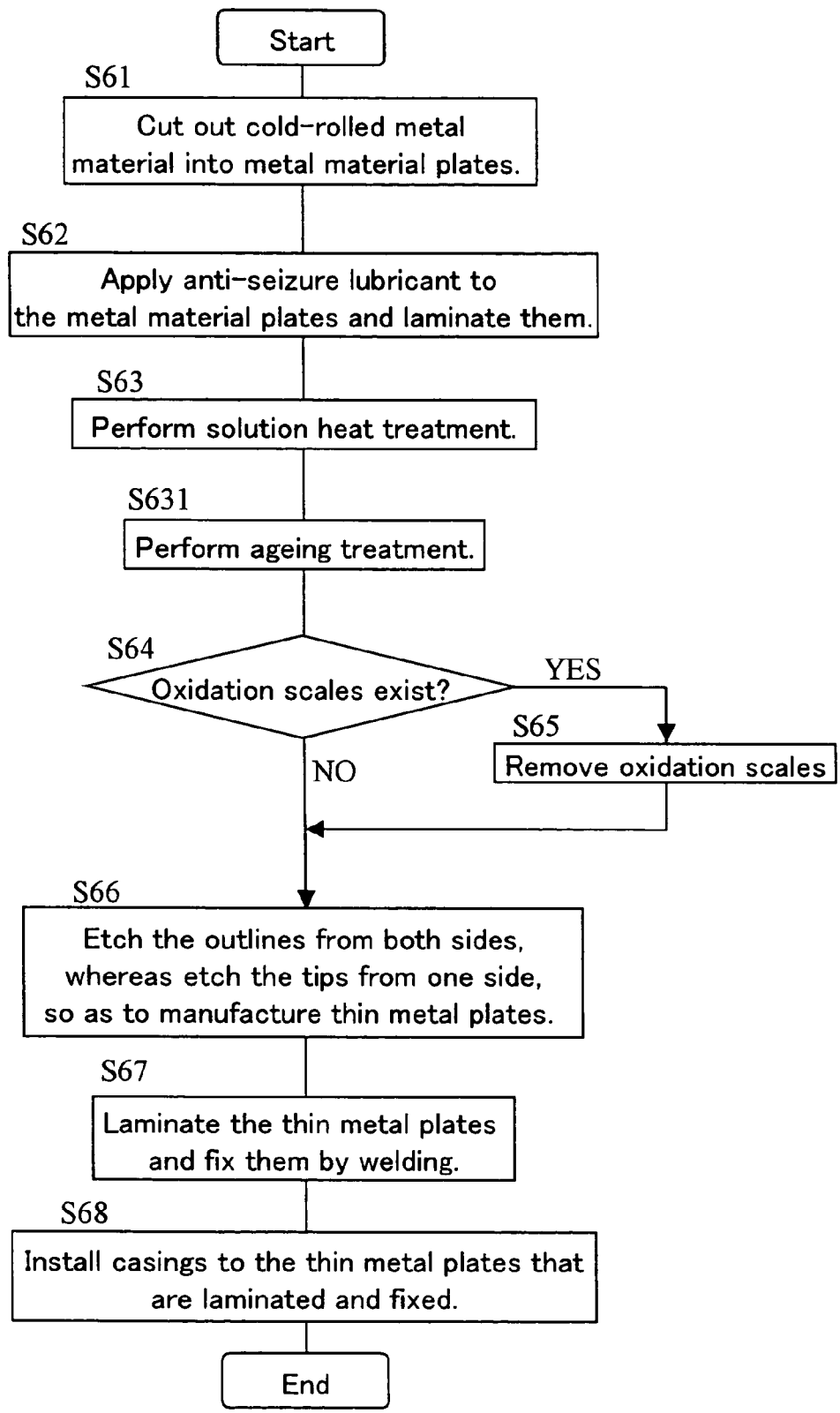
FIG. 13 is a flow chart of a manufacturing process of an axis seal.

As shown in FIG. 13, a treatment, as an ageing treatment (Step S631), may be included;

wherein, after solution heat treatment (Step S63), thin metal plates are held at 732° C. for eight hours;

wherein, subsequently, the temperature is decreased down to be 621° C., at which the thin metal plates are held for ten hours; and wherein, the thin metal plates are cooled. By performing solution heat treatment, it is possible or it is almost possible to eliminate residual stress (strain). However, ageing treatment makes it possible to eliminate residual stress (strain) and to obtain strength at high temperature as well.

Furthermore, a method is exemplified that acid or alkali liquid is used for washing in order to get rid of oxidation scales, but not limited to, and mechanical grinding with a grinder, for example, may be used. Also, it is not limited to the above-mentioned means, but it is possible to adopt means widely that can eliminate oxidation scales so as not to let them remain on the surfaces which are subject to etching.

Figure 14:
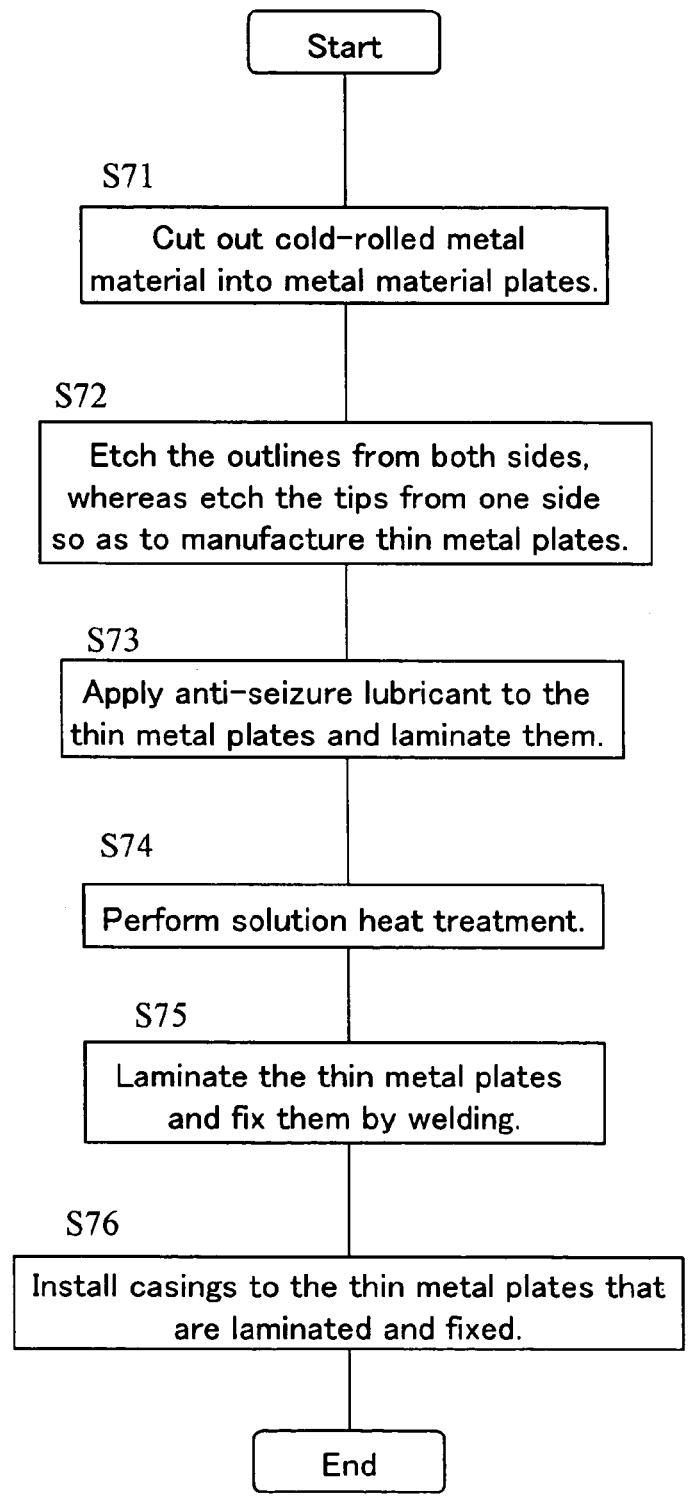
FIG. 14 is a flow chart of a manufacturing process of an axis seal.

A Seventh Embodiment of a Manufacturing Method in Accordance With the Present Invention FIG. 14 shows a flow chart of a manufacturing process of an axis seal in accordance with an embodiment of the present invention.

A roll of rolled metal material M1 is cut out into a predetermined size of metal material plates M2 to be suitable for processing. (Step S71) The portions corresponding to the outline portions of the thin metal plates 1 are etched from both sides and the portions corresponding to the tips 12 thereof are etched from one side, as mentioned above, thereby manufacturing thin metal plates 1. (Step S72) A plurality number of thin metal plates 1 manufactured in Step S72 are arranged so as to be piled up, when anti-seizure lubricant is applied to the space between the metal plates. Subsequently, the thin metal plates 1 laminated in Step S73 are heated (at 982° C. for 30 minutes) so as to be provided with solution heat treatment, thereby getting rid of residual stress (strain) from the metal plates. (See FIG. 5C). (Step S74)

Thereafter, a plurality number of thin metal plates 1 which are manufactured in Step S72 and have residual stress (strain) eliminated in Step S74 are laminated so as to orient to the same direction and to be in a ring shape, and the thin metal plates 1 are fixed to each other by welding both right and left sides 111 and 111 of the upper edge portions 11 thereof. (Step S75) After fixing a plurality number of thin metal plates 1 in laminated state, the upper edge portions thereof are fixed with the casings 2, the side plates 21 and the connection member 22 (Step S76), thus manufacturing a leaf seal.

Figure 15:
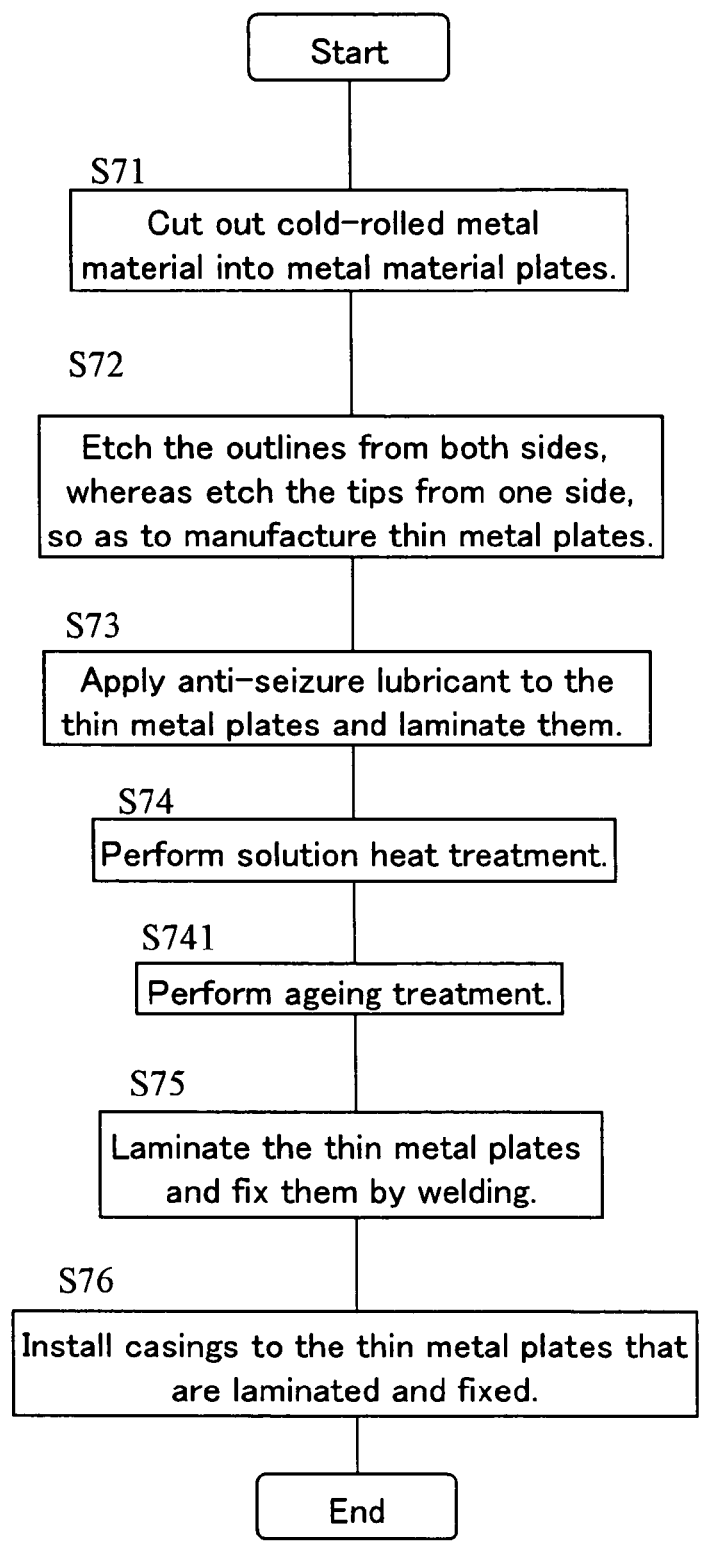
FIG. 15 is a flow chart of a manufacturing process of an axis seal.

As shown in FIG. 15, a treatment, as an ageing treatment (Step S741), may be included;

wherein, after solution heat treatment (Step S74), thin metal plates are held at 732° C. for eight hours;

wherein, subsequently, the temperature is decreased down to be 621° C., at which the thin metal plates are held for ten hours; and wherein, the thin metal plates are cooled. By performing solution heat treatment, it is possible or it is almost possible to eliminate residual stress (strain). However, ageing treatment makes it possible to eliminate residual stress (strain) and to obtain strength at high temperature as well.

Furthermore, a method is exemplified that acid or alkali liquid is used for washing in order to get rid of oxidation scales, but not limited to, and mechanical grinding with a grinder, for example, can be used. Also, it is not limited to the above-mentioned means, but it is possible to adopt means widely that can eliminate oxidation scales so as not to let them remain on the surfaces which are subject to etching.

Figure 16:
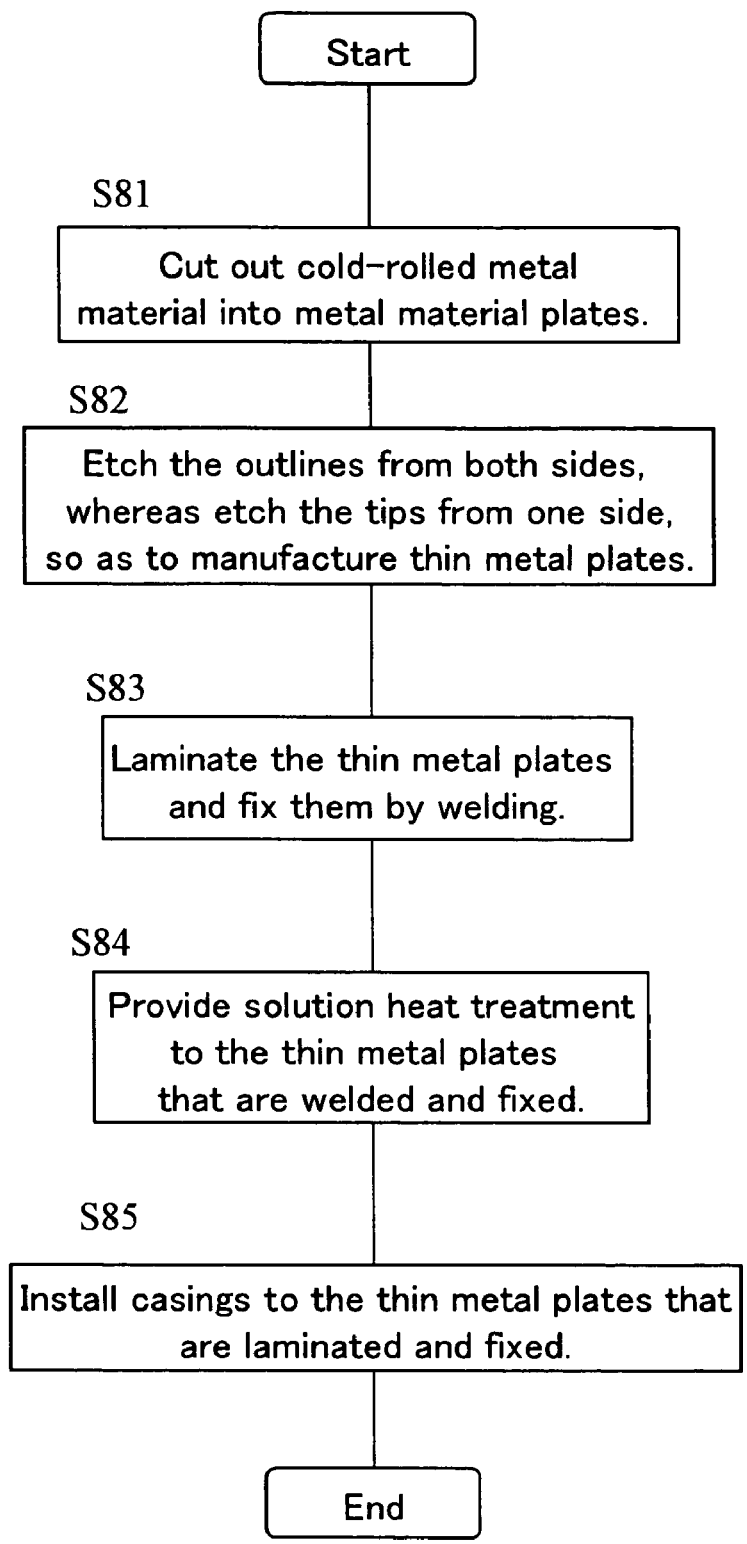
FIG. 16 is a flow chart of a manufacturing process of an axis seal.

An Eighth Embodiment of a Manufacturing Method in Accordance With the Present Invention FIG. 16 shows a flow chart of a manufacturing process of an axis seal in accordance with an embodiment of the present invention.

A roll of rolled metal material M1 is cut out into predetermined size of metal material plates M2 to be suitable for processing. (Step S81) The cut-out metal material plates M2 have the portions corresponding to the outline portions 10 of the thin metal plates 1 etched from both sides and have the portions corresponding to the tips 12 etched from one side, mentioned above, thereby manufacturing the thin metal plates 1. (Step S82) A plurality number of thin metal plates 1 manufactured in Step S82 are laminated so as to orient to the same direction and to be in a ring shape, and the thin metal plates 1 are fixed to each other by welding both right and left sides 111 and 111 of the upper edge portions 11 thereof. (Step S83) The thin metal plates 1 welded and fixed in Step S83 are heated (at 982° C. for 30 minutes) so as to be provided with solution heat treatment, thereby getting rid of residual stress (strain) from the metal plates. (See FIG. 5D). (Step S84)

Thereafter, the thin metal plates 1, which are welded and fixed in a ring shape in Step S83 and have residual stress eliminated in Step S84, have the upper edge portions 11 thereof fixed with the housings 2, the side plates 21 and the connection member 22 (Step S85), thereby manufacturing a leaf seal.

Figure 17:
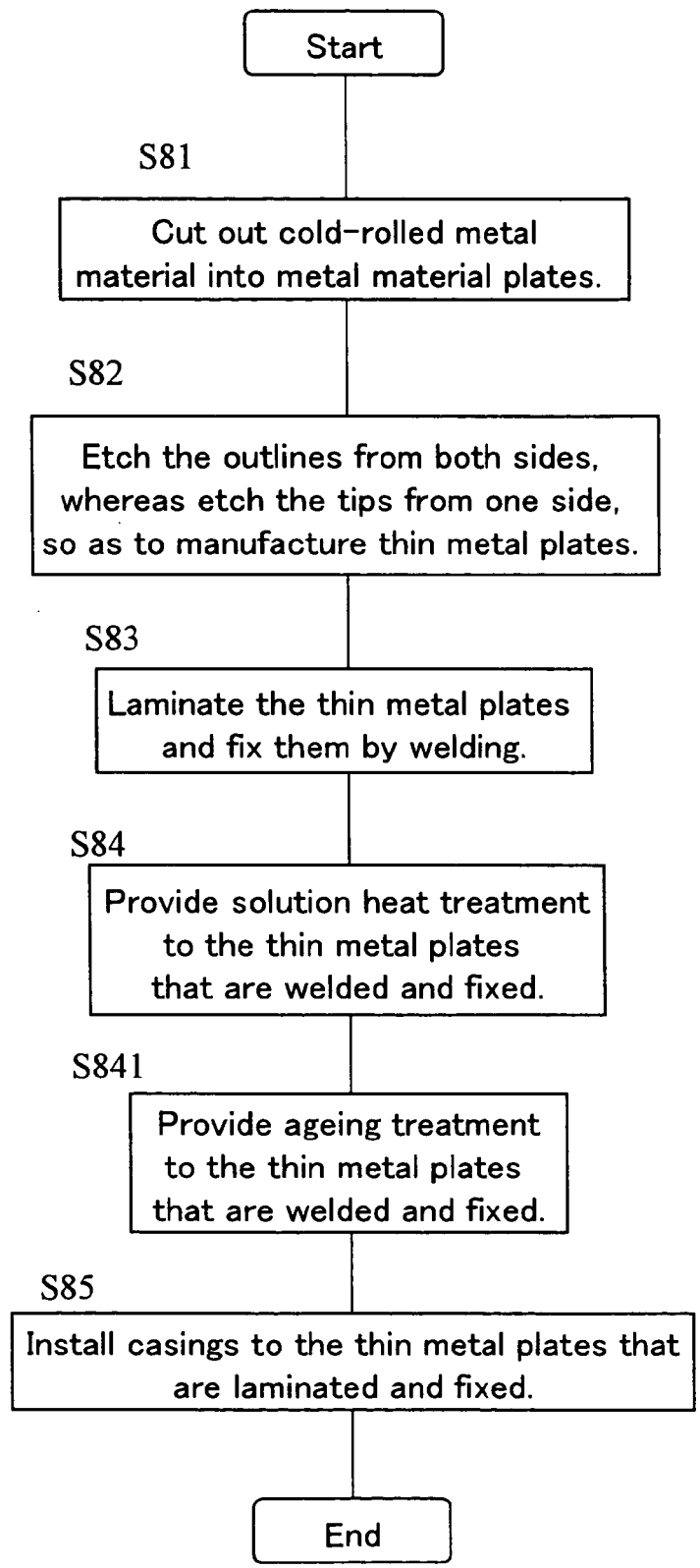
FIG. 17 is a flow chart of a manufacturing process of an axis seal.
Figure 18:
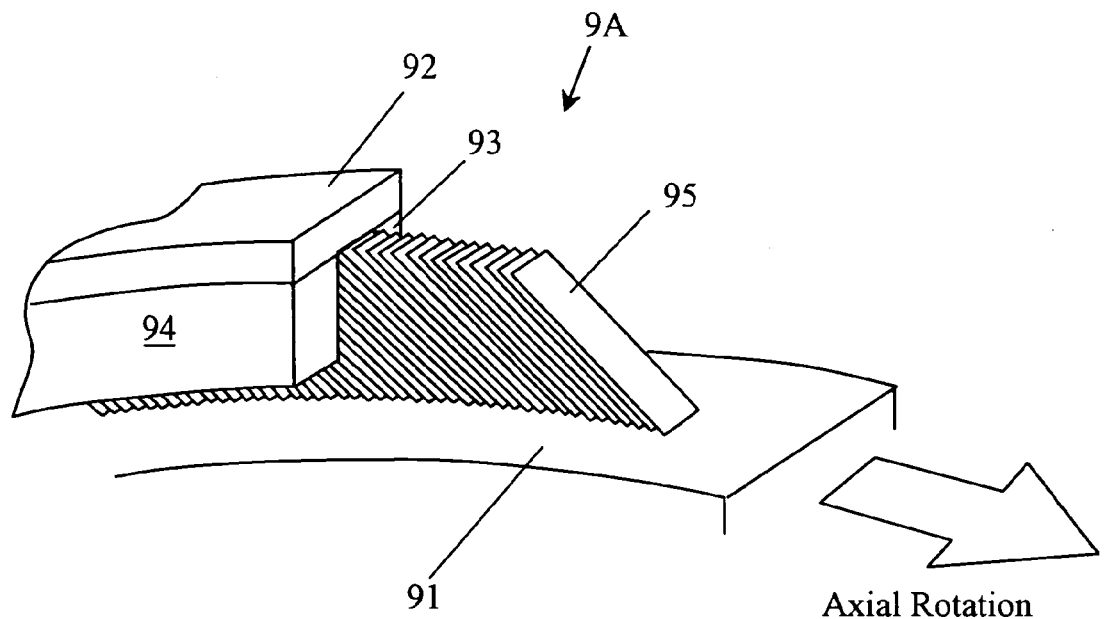
FIG. 18 is a perspective drawing of an example of a conventional leaf seal.
Figure 19A:
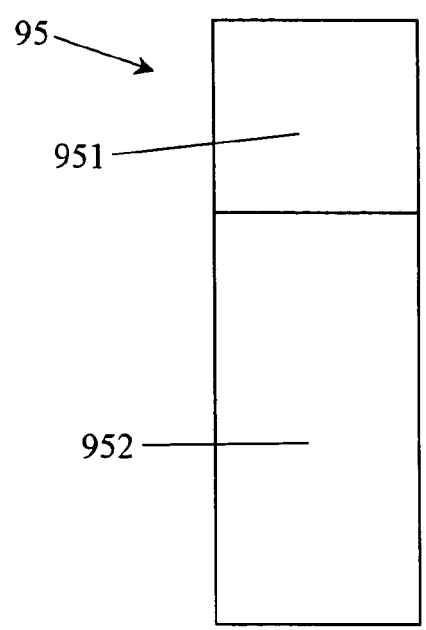
FIG. 19A is a top view of a thin metal plate to be used for a leaf seal of a conventional example.
Figure 19B:
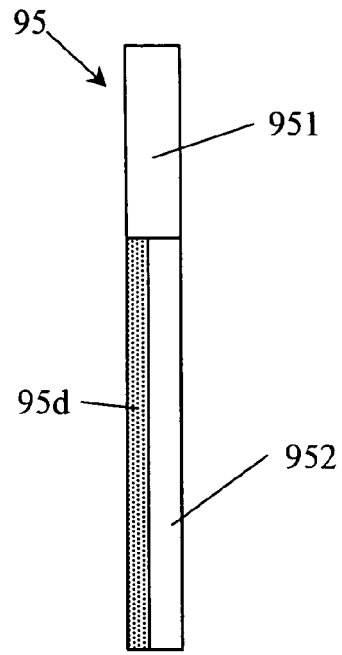
FIG. 19B is a side view of a leaf seal to be used for a leaf seal of a conventional example.
Figure 20:
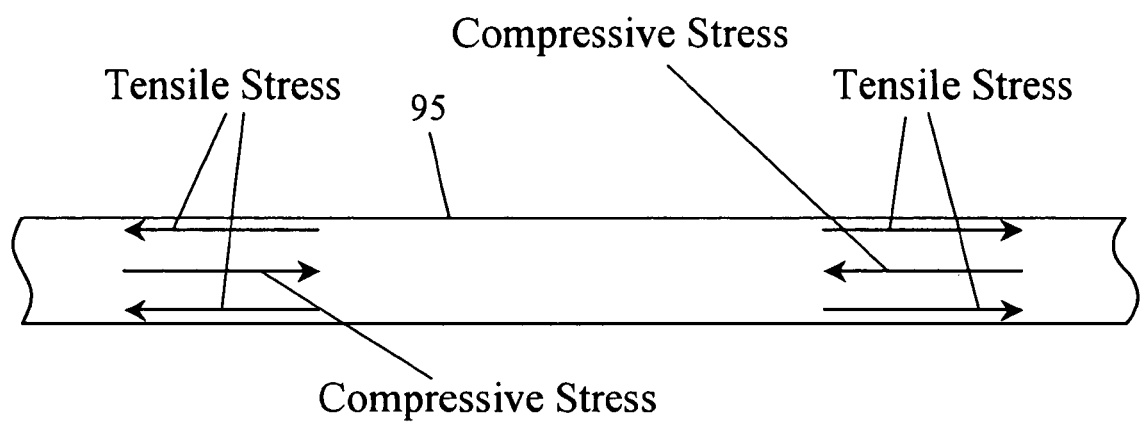
FIG. 20 depicts a state of stresses on a metal member which is cold rolled.
Figure 21:
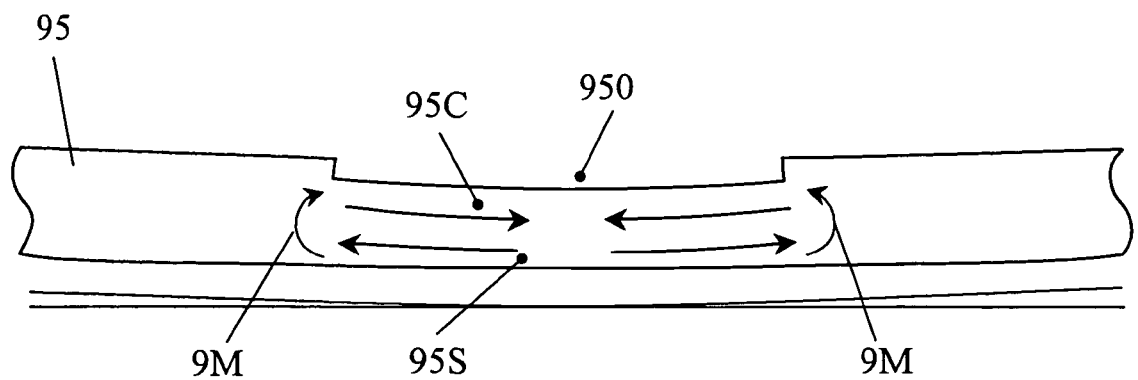
FIG. 21 depicts deformation when a portion of a metal member is cut out.

As shown in FIG. 17, a treatment may be included;

wherein, after solution heat treatment (Step S84), thin metal plates 1 are held at 732° C. for eight hours as an ageing treatment (Step S841);

wherein, subsequently, the temperature is decreased down to be 621° C., at which the thin metal plates are held for ten hours; and wherein, the thin metal plates are cooled. By performing solution heat treatment, it is possible or it is almost possible to eliminate residual stress (strain). However, ageing treatment makes it possible to eliminate residual stress (strain) and to obtain strength at high temperature as well. Additionally, since heat treatment is performed after welding, it is also possible to get rid of residual stress caused by welding.

Furthermore, a method is exemplified that acid or alkali liquid is used for washing in order to get rid of oxidation scales, but not limited to, and it is possible to adopt means widely that can eliminate oxidation scales so as not to have them remain on the surfaces which are subject to etching.

Each embodiment in accordance with the present invention mentioned above exemplifies that metal material plates are formed by cold rolling method, but not limited to, and it is possible to widely adopt a method that can stretch and roll a metal material plate to be thin.

What is claimed is:

1. A method of manufacturing an axis seal, comprising:
   cutting a roll of rolled metal material into a plurality of metal material plates of a predetermined size;
   etching a surface of the metal material plates so as to reduce a wall thickness of the metal material plates and so as to achieve a difference in level of the wall thickness of the metal material plates to thereby produce axis seal members comprising a plurality of thin metal plates;
   welding the thin metal plates together, wherein the thin metal plates formed by said etching are arranged in a ring shape so as to be oriented in a same direction and are arranged within a casing so as to be fixed; and
   heating the roll of rolled metal material, the metal material plates or the axis seal members so as to eliminate residual stress.

2. A method of manufacturing an axis seal as described in claim 1,
   wherein, in order to perform said heating between said cutting and said etching, said heating includes:
   applying an anti-seizure lubricant to surfaces of the plurality of metal material plates;
   laminating the plurality of metal material plates to which the anti-seizure lubricant is applied; and
   heating and weighting the laminated metal material plates.

3. A method of manufacturing an axis seal as described in claim 1,
   wherein, in order to perform said heating between said etching and said welding, said heating includes:
   applying an anti-seizure lubricant to spaces between the thin metal plates; and
   heating and weighting the thin metal plates to which the anti-seizure lubricant is applied.

4. A method of manufacturing an axis seal as described in claim 1, wherein said heating of the rolled metal material, the metal material plates or the axis seal members includes annealing the rolled metal material, the metal material plates or the axis seal members.

5. A method of manufacturing an axis seal as described in claim 1,
   wherein said heating of the rolled metal material, the metal material plates or the axis seal members includes heating the rolled metal material, the metal material plates or the axis seal members by a solution heat treatment.

6. A method of manufacturing an axis seal as described in claim 5, wherein, said heating is performed before said etching, the method further comprises:
   de-scaling the metal material plates prior to said etching in order to eliminate oxidation scales that are formed on a surface of the metal material plates during said heating.

7. A method of manufacturing an axis seal as described in claim 5, wherein, when said heating is performed before said etching, the method further comprises:
    polishing a surface of the metal material plates by grinding, prior to initiation of said etching, in order to eliminate oxidation scales that are formed on the surface of the metal material plates during said heating.

8. A method of manufacturing an axis seal as described in claim 5,
    wherein said heating includes performing an ageing treatment after said heating by the solution heat treatment.

9. A method of manufacturing an axis seal as described in claim 8, wherein, when said heating is to be performed before said etching, the method further comprises:
    de-scaling the metal material plates prior to said etching in order to eliminate oxidation scales that are formed on a surface of the metal material plates during said heating.

10. A method of manufacturing an axis seal as described in claim 8, wherein, when said heating is to be performed before said etching, the method further comprises:
    polishing a surface of the metal material plates by grinding, prior to initiation of said etching, in order to eliminate oxidation scales that are formed on the surface of the metal material plates during said heating.

11. A method of manufacturing an axis seal member, comprising:
    cutting a roll of rolled metal material into a plurality of metal material plates of a predetermined size;
    etching a surface of the metal material plates so as to reduce a wall thickness of the metal material plates and so as to achieve a difference in level of the wall thickness of the metal material plates to thereby produce axis seal members comprising a plurality of thin metal plates; welding the thin metal plates together and arranging the thin metal plates in a ring shape so as to be oriented in a same direction, and arranging the thin metal plates within a casing so as to be fixed; and
    heating the roll of rolled metal material, the metal material plates or the axis seal members so as to eliminate residual stress;
    wherein each of the axis seal members is a thin metal plate that has no strain or approximately has no strain.

12. A method of manufacturing an axis seal, comprising:
    cutting a roll of rolled metal material into a plurality of metal material plates of a predetermined size;
    etching a surface of the metal material plates so as to reduce a wall thickness of the metal material plates and so as to achieve a difference in level of the wall thickness of the metal material plates to thereby produce axis seal members comprising a plurality of thin metal plates;
    welding the thin metal plates together and arranging the thin metal plates in a ring shape, so as to be oriented in a same direction, and arranging the thin metal plates within a casing so as to be fixed; and
    heating the roll of rolled metal material, the metal material plates or the axis seal members so as to eliminate residual stress;
    wherein the axis seal is to be installed so as to surround a rotation axis in a manner such that when the rotation axis is not rotating, tips of the axis seal members are arranged so as to be in contact with the rotation axis, and such that when the rotation axis rotates, tips of the axis seal members rise slightly from the rotation axis due to dynamic pressure caused by rotation.

13. A method of manufacturing a rotary machine, comprising:
    cutting a roll of rolled metal material into a plurality of metal material plates of a predetermined size;
    etching a surface of the metal material plates so as to reduce a wall thickness of the metal material plates and so as to achieve a difference in level of the wall thickness of the metal material plates to thereby produce axis seal members comprising a plurality of thin metal plates;
    welding the thin metal plates together and arranging the thin metal plates in a ring shape so as to be oriented in a same direction, and arranging the thin metal plates within a casing so as to be fixed; and
    heating the roll of rolled metal material, the metal material plates or the axis seal members so as to eliminate residual stress;
    wherein the rotary machine includes a rotation axis and an axis seal, the axis seal separating a space surrounding the rotation axis into a high pressure region and a low pressure region by arranging the axis seal so as to surround the rotation axis.

* * * * *